(12) United States Patent
Fonk et al.

(10) Patent No.: US 11,867,715 B2
(45) Date of Patent: *Jan. 9, 2024

(54) IMPACT INDICATOR

(71) Applicant: ShockWatch, Inc., Dallas, TX (US)

(72) Inventors: Anthony N. Fonk, Austin, TX (US); Johannes A. van Niekerk, Dallas, TX (US); Francisco Javier Vega Triste, Chihuahua (MX); Alvaro Tijerina Ahjuech, Chihuahua (MX)

(73) Assignee: Shock Watch, Inc., Dallas, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/446,899

(22) Filed: Sep. 3, 2021

(65) Prior Publication Data

US 2021/0396782 A1 Dec. 23, 2021

Related U.S. Application Data

(63) Continuation of application No. 16/588,055, filed on Sep. 30, 2019, now Pat. No. 11,112,425.

(51) Int. Cl.
*G01P 15/135* (2006.01)
*G01P 1/07* (2006.01)

(52) U.S. Cl.
CPC .............. *G01P 15/135* (2013.01); *G01P 1/07* (2013.01)

(58) Field of Classification Search
CPC ........ G01P 1/07; G01P 15/08; G01P 15/0802; G01P 15/135

See application file for complete search history.

(56) References Cited

U.S. PATENT DOCUMENTS

| | | | |
|---|---|---|---|
| 1,598,877 A | 9/1926 | Phelan et al. |
| 2,825,297 A | 3/1958 | Harrison |
| 2,976,732 A | 3/1961 | Hautly |
| 3,021,813 A | 2/1962 | Rips |
| 3,312,188 A | 4/1967 | Lode et al. |
| 3,373,716 A | 3/1968 | Williams |
| 3,425,388 A | 2/1969 | West |
| 3,461,730 A | 8/1969 | Peters |
| 3,623,449 A | 11/1971 | Knutson |
| 3,707,722 A | 12/1972 | Itoh |
| 3,782,204 A | 1/1974 | Boardman |

(Continued)

FOREIGN PATENT DOCUMENTS

| | | |
|---|---|---|
| GB | 826735 | 1/1960 |
| GB | 1409847 | 10/1975 |

(Continued)

OTHER PUBLICATIONS

International Search Report and Written Opinion; PCT Application No. PCT/US2018/039098; dated Oct. 22, 2018.

*Primary Examiner* — Benjamin R Schmitt
(74) *Attorney, Agent, or Firm* — Dority & Manning, P.A.

(57) ABSTRACT

According to one aspect of the present disclosure, a device and technique for impact detection includes a housing, switch circuitry having an omega-shaped switch element, and a mass member movable within the housing from a first position to a second position in response to receipt by the housing of an acceleration event. Movement of the mass member to the second position causes the mass member to move the switch element to change a state of a circuit condition of the switch circuitry, and the change of the state of the switch circuitry indicates receipt of the acceleration event.

20 Claims, 16 Drawing Sheets

(56) References Cited

U.S. PATENT DOCUMENTS

| | | |
|---|---|---|
| 3,835,809 A | 9/1974 | Sinn, Jr. |
| 3,909,568 A | 9/1975 | Greenhug |
| 4,060,004 A | 11/1977 | Scholz et al. |
| 4,068,613 A | 1/1978 | Rubey |
| 4,072,835 A | 2/1978 | Burke |
| 4,103,640 A | 8/1978 | Feder |
| 4,125,085 A | 11/1978 | Rubey |
| 4,177,751 A | 12/1979 | Rubey |
| 4,219,708 A | 8/1980 | Rubey |
| 4,237,736 A | 12/1980 | Wright |
| 4,239,014 A | 12/1980 | Rubey |
| 4,361,106 A | 11/1982 | Eklof |
| 4,470,302 A | 9/1984 | Carte |
| 4,528,851 A | 7/1985 | Ozols |
| 4,688,244 A | 8/1987 | Hannon et al. |
| 4,943,690 A | 7/1990 | Bitko |
| 4,982,684 A | 1/1991 | Rubey |
| 5,027,105 A | 6/1991 | Dailey et al. |
| 5,051,725 A | 9/1991 | Caccitolo |
| 5,153,561 A | 10/1992 | Johnson |
| 5,269,252 A | 12/1993 | Nagai |
| 5,323,729 A | 6/1994 | Rubey |
| 5,347,274 A | 9/1994 | Hassett |
| 5,351,539 A | 10/1994 | Ziegenbein et al. |
| 5,551,279 A | 9/1996 | Quick |
| 5,962,789 A | 10/1999 | Matsunaga et al. |
| 6,272,901 B1 | 8/2001 | Takeuchi et al. |
| 6,301,718 B1 | 10/2001 | Rigal |
| 6,313,417 B1 | 11/2001 | Schnell |
| 6,314,907 B1 | 11/2001 | Harris et al. |
| 6,367,408 B1 | 4/2002 | Gu |
| 6,685,094 B2 | 2/2004 | Cameron |
| 6,698,272 B1 | 3/2004 | Almirante |
| 6,848,389 B1 | 2/2005 | Elsasser et al. |
| 7,119,759 B2 | 10/2006 | Zehner |
| 7,219,619 B2 | 5/2007 | Fitzer et al. |
| 7,353,615 B1 | 4/2008 | Branch |
| 7,509,835 B2 | 3/2009 | Beck |
| 7,918,179 B2 | 4/2011 | Pan et al. |
| 8,074,489 B2 | 12/2011 | Ishikawa et al. |
| 8,234,993 B2 | 8/2012 | Naruishi et al. |
| 8,234,994 B1 | 8/2012 | Branch |
| 8,240,270 B2 | 8/2012 | Naruishi |
| 8,307,775 B2 | 11/2012 | Naruishi et al. |
| 8,387,552 B2 | 3/2013 | Branch |
| 8,616,146 B2 | 12/2013 | Martin et al. |
| 8,646,401 B2 | 2/2014 | Branch |
| 8,863,683 B2 | 10/2014 | Branch et al. |
| 9,103,734 B2 | 8/2015 | Branch |
| 9,190,229 B2 | 11/2015 | Branch |
| 9,217,683 B2 | 12/2015 | Branch |
| 9,423,312 B2 | 8/2016 | Branch et al. |
| 9,502,196 B2 | 11/2016 | Branch |
| 2004/0231428 A1 | 11/2004 | Roberge |
| 2005/0039669 A1 | 2/2005 | Elsasser et al. |
| 2007/0182578 A1 | 8/2007 | Smith |
| 2007/0194943 A1 | 8/2007 | Fitzer et al. |
| 2009/0307827 A1 | 12/2009 | Aspray |
| 2011/0100124 A1 | 5/2011 | Zedesky et al. |
| 2011/0139060 A1 | 6/2011 | Sheau-Shi et al. |
| 2011/0219852 A1 | 9/2011 | Kasten |
| 2012/0312224 A1 | 12/2012 | Branch |
| 2015/0082861 A1 | 3/2015 | Gibson et al. |
| 2018/0372775 A1 | 12/2018 | Fonk et al. |
| 2019/0128754 A1 | 5/2019 | Fonk et al. |

FOREIGN PATENT DOCUMENTS

| | | |
|---|---|---|
| JP | 2006300768 | 11/2006 |
| JP | 2009156726 | 7/2009 |
| WO | 2008060003 | 5/2008 |

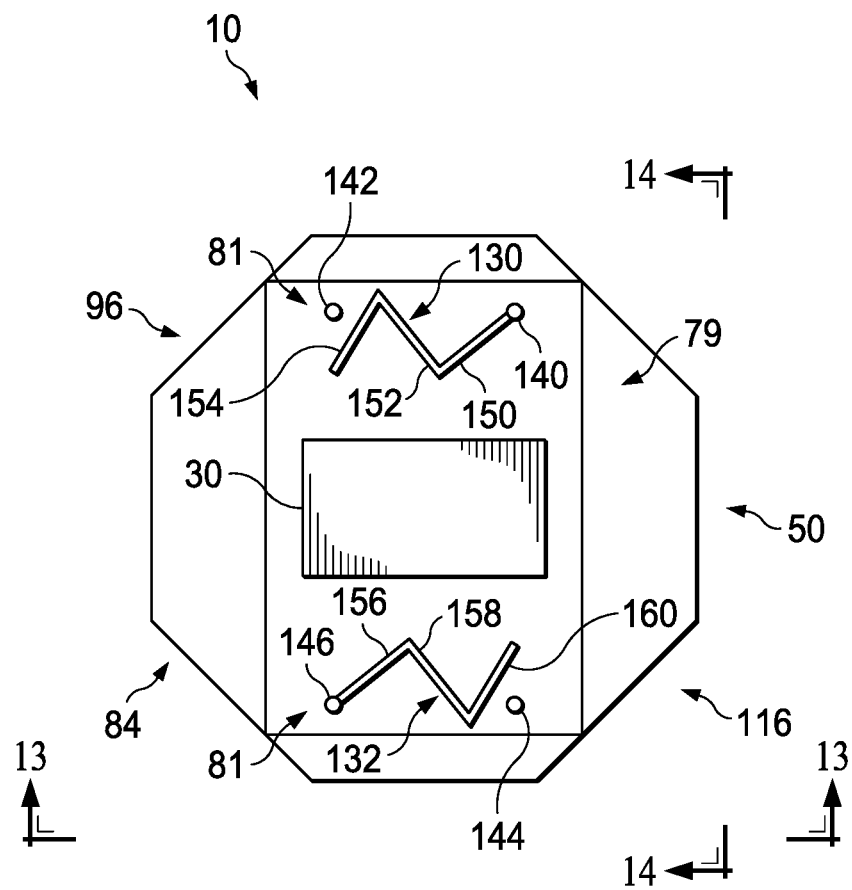
FIG. 12
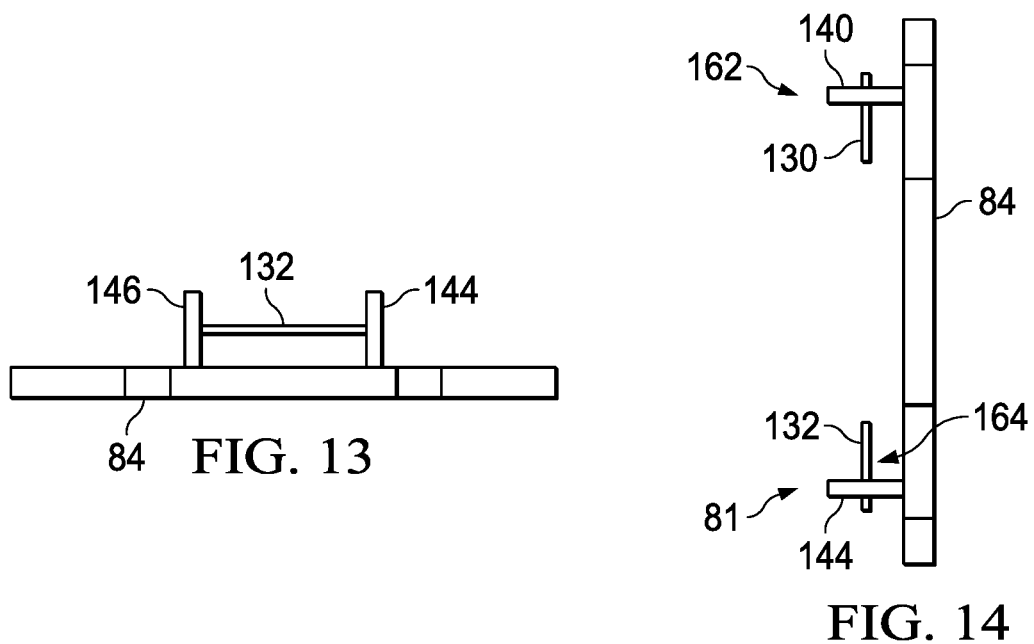
FIG. 13
FIG. 14

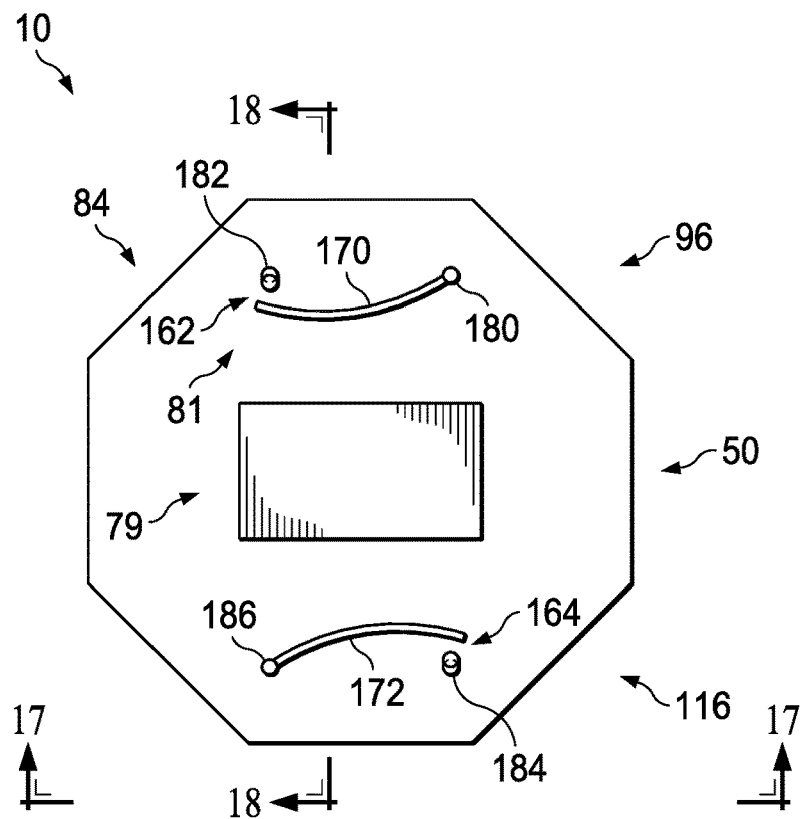
FIG. 16
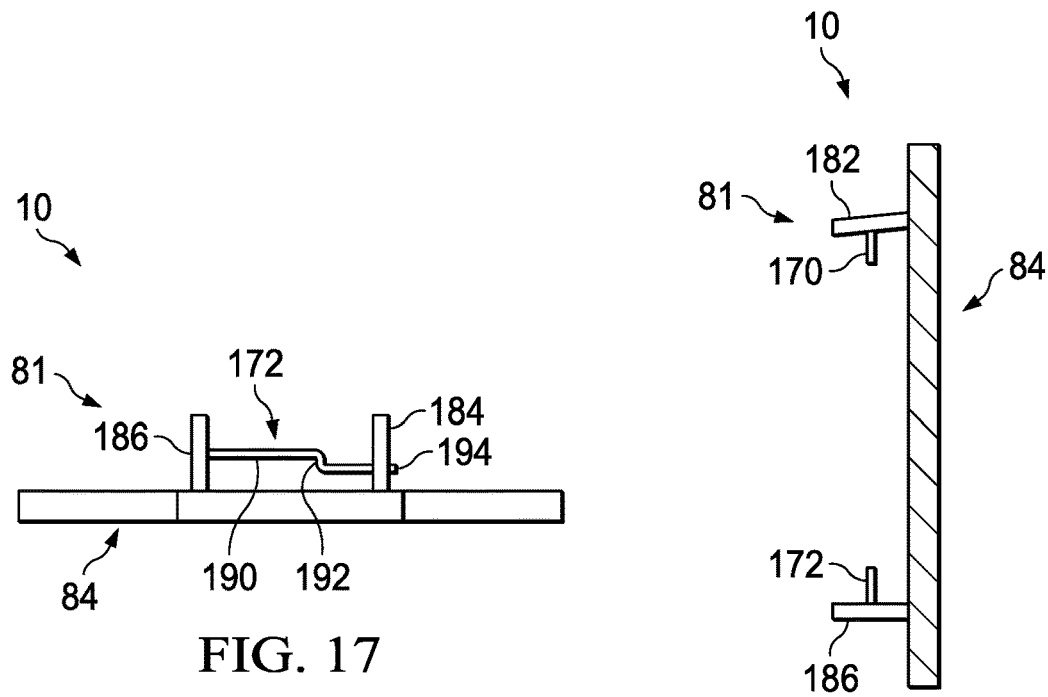
FIG. 17
FIG. 18

IMPACT INDICATOR

BACKGROUND

During manufacturing, storage or transit, many types of objects need to be monitored due to the sensitivity or fragility of the objects. For example, some types of objects may be susceptible to damage if dropped or a significant impact is received. Thus, for quality control purposes and/or the general monitoring of transportation conditions, it is desirable to determine and/or verify the environmental conditions to which the object has been exposed.

BRIEF SUMMARY

According to one aspect of the present disclosure, a device and technique for impact detection is disclosed. The impact indicator includes a housing, switch circuitry having an omega-shaped switch element, and a mass member movable within the housing from a first position to a second position in response to receipt by the housing of an acceleration event. Movement of the mass member to the second position causes the mass member to move the switch element to change a state of a circuit condition of the switch circuitry, and the change of the state of the switch circuitry indicates receipt of the acceleration event.

According to another embodiment of the present disclosure, an impact indicator includes a housing, switch circuitry having an omega-shaped switch element coupled to a plurality of spaced apart conductive contacts, and a mass member movable within the housing in response to receipt by the housing of an acceleration event. Movement of the mass member causes the switch element to disengage from the contacts to change a state of a circuit condition of the switch circuitry, and the change in the state of the switch circuitry indicates receipt of the acceleration event.

According to yet another embodiment of the present disclosure, an impact indicator includes a housing, switch circuitry having an omega-shaped switch element and a plurality of spaced apart conductive contacts, wherein each leg of the switch element is coupled to a respective contact, and a mass member movable within the housing in response to receipt by the housing of an acceleration event. Movement of the mass member causes the switch element to disengage from the contacts to change a state of a circuit condition of the switch circuitry, and the change in the state of the switch circuitry indicates receipt of the acceleration event.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 12 is a diagram illustrating another embodiment of an impact indicator in accordance with the present disclosure;

FIG. 13 is a diagram illustrating a bottom view of the impact indicator of FIG. 12 in accordance with an embodiment of the present disclosure viewed from the line 13-13 in FIG. 12;

FIG. 14 is a diagram illustrating a side view of the impact indicator depicted in FIG. 12 in accordance with an embodiment of the present disclosure viewed from the line 14-14 of FIG. 12;

FIG. 16 is a diagram illustrating another embodiment of an impact indicator in accordance with the present disclosure;

FIG. 17 is a diagram illustrating a bottom view of the impact indicator of FIG. 16 in accordance with an embodiment of the present disclosure viewed from the line 17-17 in FIG. 16;

FIG. 18 is a diagram illustrating a section view of the impact indicator depicted in FIG. 16 in accordance with an embodiment of the present disclosure taken along the line 18-18 of FIG. 16;

DETAILED DESCRIPTION

Embodiments of the present disclosure provide a device and technique for impact detection and indication. According to one embodiment, an impact indicator includes a housing, switch circuitry having an omega-shaped switch element, and a mass member movable within the housing from a first position to a second position in response to receipt by the housing of an acceleration event. Movement of the mass member to the second position causes the mass member to move the switch element to change a state of a circuit condition of the switch circuitry, and the change of the state of the switch circuitry indicates receipt of the acceleration event. Embodiments of the present disclosure enable impact and/or acceleration event detection using no internal power supply. For example, a mechanical-based switch mechanism closes or opens switch circuitry in response to detecting an impact or acceleration event. In some embodiments, a radio-frequency identification (RFID) module can detect the state of the switch circuitry and emit or output a particular value based on whether the switch circuitry is in a closed or open condition. In such embodiments, an RFID reader can be used to activate the RFID module and determine an activation status of the impact indicator device.

Figure 1A:
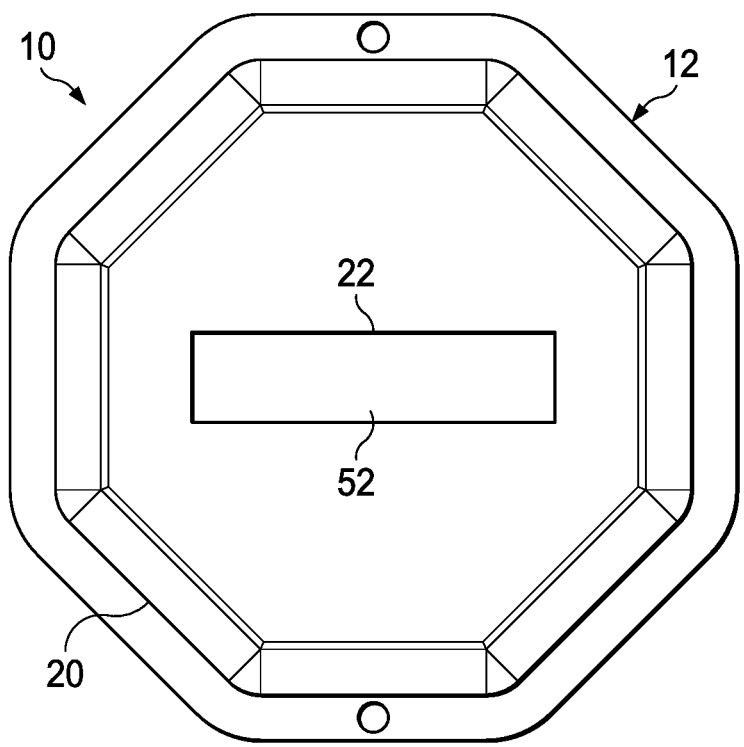
FIGS. 1A and 1B are diagrams illustrating respective front and rear views of an embodiment of an impact indicator according to the present disclosure.
Figure 1B:
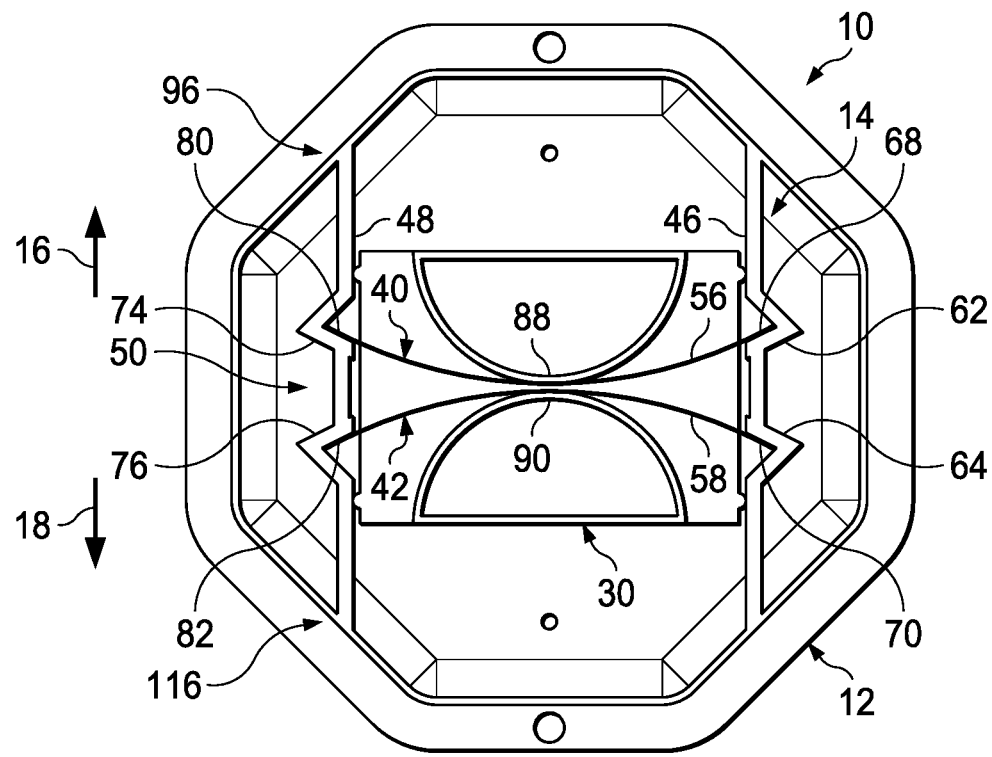

With reference now to the Figures and in particular with reference to FIGS. 1A and 1B, exemplary diagrams of an impact indicator 10 are provided in which illustrative embodiments of the present disclosure may be implemented. FIG. 1A is a diagram illustrating a front view of impact indicator 10, and FIG. 1B is a diagram illustrating a rear view of impact indicator 10. In FIGS. 1A and 1B, indicator 10 is a portable device configured to be affixed to or disposed within a transport container containing an object of which impact and/or acceleration events associated therewith are to be monitored. Embodiments of impact indicator 10 monitor whether an object has been exposed to an impact or some level of an acceleration event during manufacturing, storage and/or transport of the object. In some embodiments, impact indicator 10 may be affixed to a transport container using, for example, adhesive materials, permanent or temporary fasteners, or a variety of different types of attachment devices. The transport container may include a container in which a monitored object is loosely placed or may comprise a container of the monitored object itself. It should be appreciated that FIGS. 1A and 1B are only exemplary and are not intended to assert or imply any limitation with regard to the environments in which different embodiments may be implemented.

In the embodiment illustrated in FIGS. 1A and 1B, impact indicator 10 comprises a housing 12 having a detection assembly 14 disposed therein. In the illustrated embodiment, detection assembly 14 is configured to detect and indicate impact or acceleration events in either of two different directions, indicated by direction 16 or direction 18 relative to indicator 10 in FIG. 1B (i.e., in direction 16/18 or at an angle thereto having a directional vector component in a corresponding direction 16/18). However, it should be understood that assembly 14 may be configured for detecting/indicating an impact event corresponding to a single direction (as will be described further below). Further, it should be understood that additional detection assemblies 14 may be included in indicator 10 to provide impact detection/indication in additional directions.

In some embodiments, housing 12 is configured and/or constructed from a clear or semi-opaque material having a masking label 20 located on a front side thereof or affixed thereto (FIG. 1A). In some embodiments, masking label 20 is configured having one or more apertures or "windows" 22 for providing a visual indication of impact detection. For example, as will be described further below, in response to indicator 10 being subjected to or receiving some predetermined level of impact or acceleration event, detection assembly 14 causes a visual indication to be displayed within or through one or more of windows 22 to provide a visual indication that the monitored object has or may have been subjected to some level of impact. However, it should be understood that other methods may be used to provide a visual indication that detection assembly 14 has moved and/or been otherwise placed into an activated state indicating that indicator 10 has experienced a shock, impact or acceleration event. It should also be understood that housing 12 may be configured and/or manufactured from other materials (e.g., opaque materials having one or more windows 22 formed therein). In some embodiments, housing 12 may be configured without window 22. For example, as will be described in greater detail below, indicator 10 may be configured to provide visual and/or non-visual indications of whether an impact or acceleration condition has been experienced by indicator 10 (e.g., via the use of RFID signals).

Referring to FIG. 1B, detection assembly 14 is illustrated in a non-activated or initial pre-detection state (i.e., prior to being subjected to an acceleration event). In the illustrated embodiment, detection assembly 14 comprises a weight or mass member 30 and spring members 40 and 42. Housing 12 comprises sidewalls 46 and 48 located on opposite sides of mass member 30. Sidewalls 46 and 48 form a translation path to enable movement of mass member 30 within housing 12 in response to housing 12 or indicator 10 being subjected to an acceleration event. For example, in FIG. 1B, mass member 30 is located in a non-activated position 50 within housing 12. Additionally, referring to FIG. 1A, a medial surface portion 52 of mass member 30 is located within and/or is otherwise visible within window 22.

In the embodiment illustrated in FIG. 1B, spring members 40 and 42 bias mass member 30 to the non-activated position 50 in the pre-detection state of indicator 10. For example, in the illustrated embodiment, spring members 40 and 42 comprise leaf springs 56 and 58, respectively; however, it should be understood that other types of biasing elements may be used. In FIG. 1B, sidewall 46 has formed therein recesses or seats 62 and 64 for holding respective ends 68 and 70 of leaf springs 56 and 58. Sidewall 48 has formed therein recesses or seats 74 and 76 for holding respective ends 80 and 82 of leaf springs 56 and 58. Leaf springs 56 and 58 are formed having a length greater than a width of mass member 30 (e.g., as measured in a direction from sidewall 46 to sidewall 48). The ends 68 and 80 of leaf spring 56 are located in respective seats 62 and 74 such that leaf spring 56 is positioned in an orientation transverse to the movement path of mass member 30. The ends 70 and 82 of leaf spring 58 are located in respective seats 64 and 76 such that leaf spring 58 is positioned in an orientation transverse to the movement path of mass member 30. For example, the translation path formed by sidewalls 46 and 48 enables movement of mass member 30 in the directions indicated by 16 and 18.

Ends 68 and 80 of leaf spring 56 are located in seats 62 and 80, and ends 70 and 82 of leaf spring 58 are located in respective seats 64 and 76, such that leaf springs 56 and 58 have convex surfaces facing each other. Thus, in the illustrated embodiment, leaf springs 56 and 58 are biased towards each other. In the embodiment illustrated in FIG. 1B, leaf springs 56 and 58 each extend laterally across a medial portion of mass member 30 between opposing arcuately formed walls 88 and 90 of mass member 30. Leaf springs 56 and 58 are biased toward each other and support mass 30 in the non-activated position 50 (e.g., leaf springs 56 and 58 contact and support respective walls 88 and 90 of mass member 30 to retain mass member 30 in the non-activated position 50). It should be understood that mass member 30 may be otherwise formed and/or spring members 40 and 42 may be otherwise configured and/or positioned relative to mass member 30 to retain and/or bias mass member 30 to the non-activated position 50.

Figure 2A:
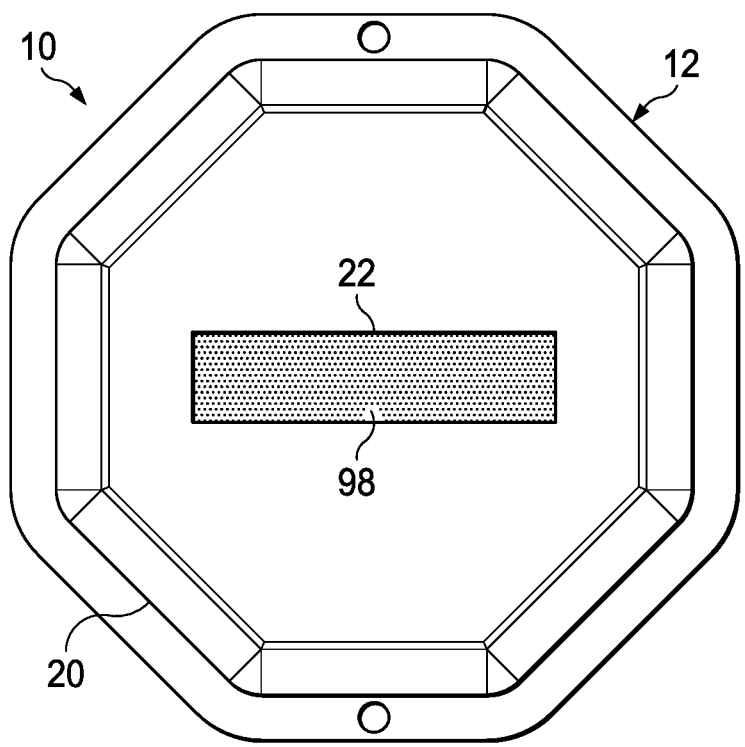
FIGS. 2A and 2B are diagrams illustrating respective front and rear views of the impact indicator of FIGS. 1A and 1B in an activated state according to the present disclosure.
Figure 2B:
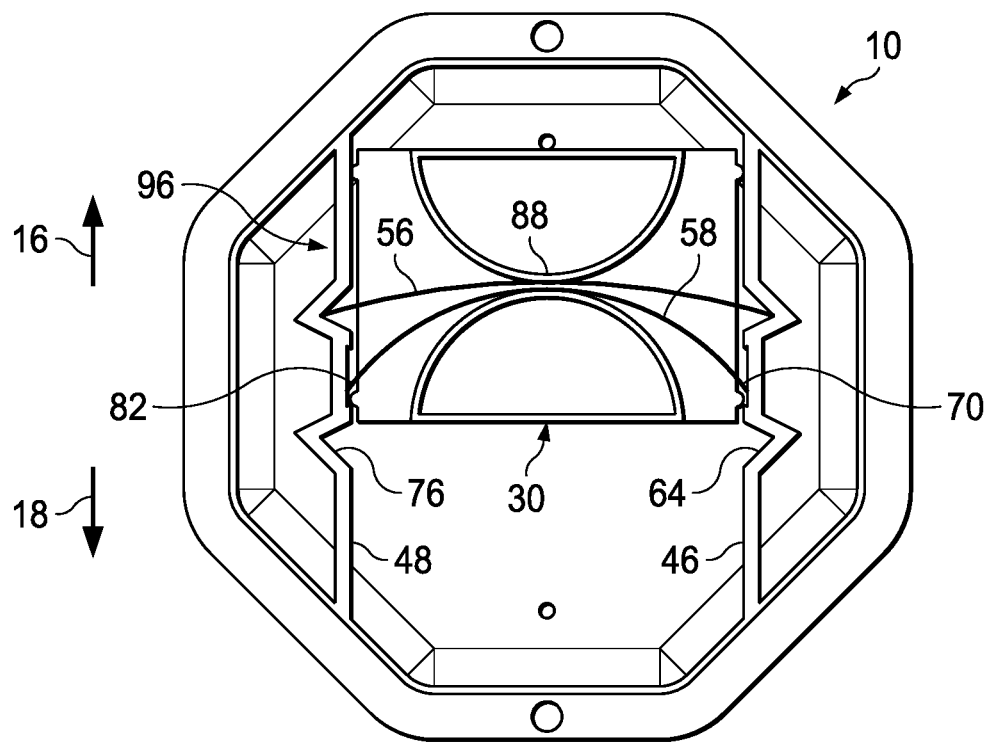

FIGS. 2A and 2B are diagrams illustrating respective front and rear views of indicator 10 illustrated in FIGS. 1A and 1B in an activated state. In the embodiment illustrated in FIGS. 2A and 2B, indicator 10 and/or housing 12 has been subjected to an impact and/or acceleration event in a direction corresponding to direction 16 of a level and/or magnitude to overcome the bias force of spring members 40 and 42 and thereby cause mass member 30 to move from non-activated position 50 to an activated position 96. In response to the acceleration event, leaf spring 56 inverts and a convex portion thereof applies a biasing force against wall 88 of mass member 30 to bias mass member 30 to the activated position 96. Additionally, in response to the acceleration event and movement of mass member 30 to the activated position 96, ends 70 and 82 of leaf spring 58 are drawn out of respective seats 64 and 76. As best illustrated in FIG. 2A, in the activated position 96, a different portion of mass member 30 is located within and/or is otherwise visible in window 22 than when mass member 30 is in the non-activated position 50. For example, in the non-activated position 50, a medial portion of mass member 30 (e.g., medial surface portion 52 (FIG. 1A)) is located within and/or is otherwise visible in window 22. However, in response to movement of mass member 30 to the activated position 96, a surface portion 98 located adjacent medial surface portion 52 is located within and/or is otherwise visible in window 22. As will be described further below, mass member 30 may contain, at different locations thereon, different types and/or forms of indicia on a side thereof facing window 22 corresponding to the non-activated and activated positions of mass member 30 within housing 12 to provide an indication as to whether indicator 10 has been subjected to a certain level or magnitude of acceleration event/impact.

Figure 3A:
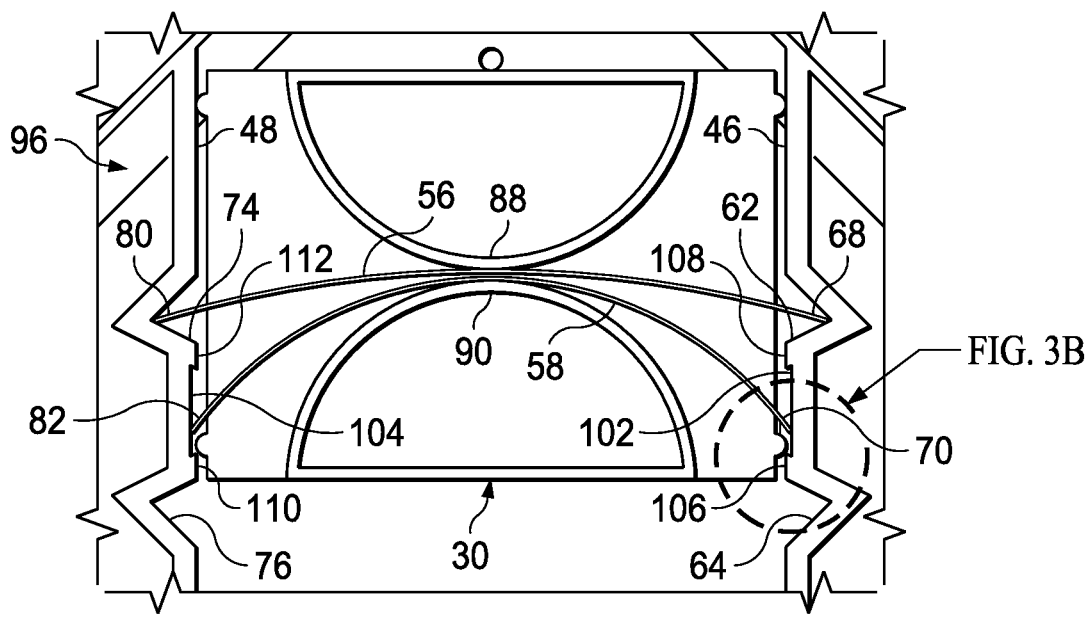
FIG. 3A is a diagram illustrating an enlarged view of a portion of the impact indicator illustrated in FIG. 2B in accordance with the present disclosure.
Figure 3B:
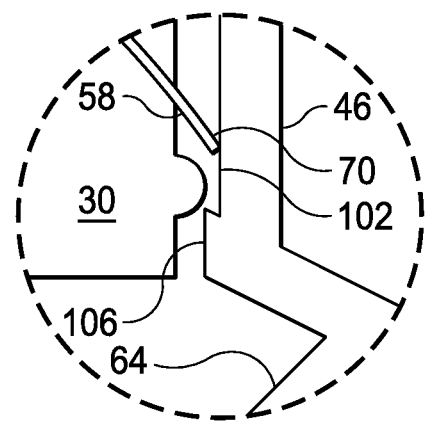
FIG. 3B is a diagram illustrating an enlarged view of a portion of the impact indicator illustrated in FIG. 3A in accordance with the present disclosure.

FIG. 3A is a diagram illustrating an enlarged view of a portion of FIG. 2B of indicator 10, and FIG. 3B is a diagram illustrating an enlarged view of a portion of FIG. 3A of indicator 10. Referring to FIGS. 2B, 3A and 3B, as described above, in response to an acceleration event in direction 16 of a level and/or magnitude to overcome the bias force of spring members 40 and 42, leaf spring 56 inverts and a convex portion thereof applies a biasing force against wall 88 of mass member 30 to bias mass member 30 to the activated position 96. Additionally, ends 70 and 82 of leaf spring 58 are drawn out of respective seats 64 and 76. As best illustrated in FIGS. 3A and 3B, sidewalls 46 and 48 have formed therein indent regions 102 and 104, respectively, that are set back and/or offset from adjacent wall surfaces 106, 108, 110 and 112 of sidewalls 46 and 48, respectively. Indent region 102 is located along sidewall 46 between seats 62 and 64, and indent regions 104 is located along sidewall 48 between seats 74 and 76. In response to movement of mass member 30 to the activated position 96, ends 70 and 82 of leaf spring 58 are drawn out of respective seats 64 and 76 and become positioned within respective indent regions 102 and 104. Indent regions 102 and 104 prevent or substantially prevent ends 70 and 82 of leaf spring 58 from returning to respective seats 64 and 76. Thus, if indicator 10 is subjected to another acceleration event in a direction opposite direction 16 (e.g., direction 18) in an attempt to reset and/or re-position mass member 30 in the non-activated position 50 after being in an activated state, indent regions 102 and 104 resist the return of ends 70 and 82 of leaf spring 58 to seats 64 and 76, thereby resulting in an additional bias force in the direction 16 that would need to be overcome in an opposite direction to effectuate movement of mass member 30 toward the non-activated position 50.

Figure 4A:
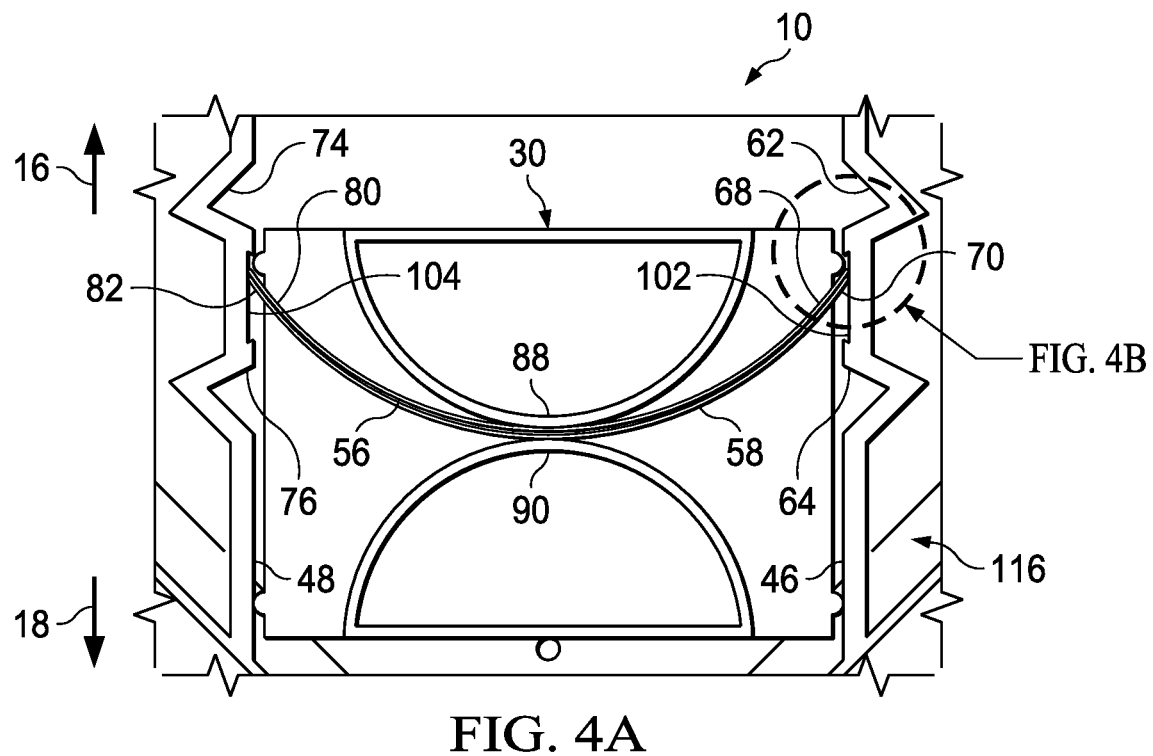
FIG. 4A is another diagram illustrating an enlarged view of a portion of the impact indicator of FIGS. 1A and 1B in an activated state according to the present disclosure.
Figure 4B:
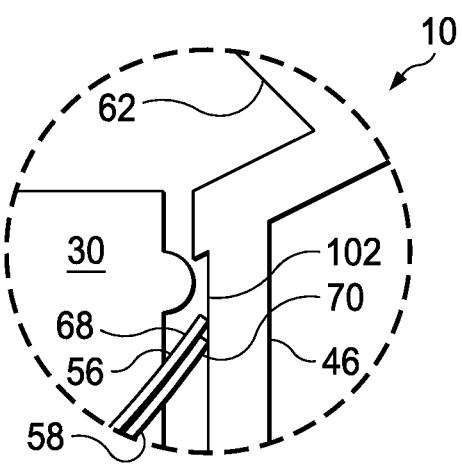
FIG. 4B is a diagram illustrating an enlarged view of a portion of the impact indicator illustrated in FIG. 4A in accordance with the present disclosure.

FIG. 4A is a diagram illustrating an enlarged view of a portion of indicator 10 with mass member 30 located in another activated position 116 (e.g., on a side of housing 12 opposite activated position 96), and FIG. 4B is a diagram illustrating an enlarged view of a portion of FIG. 4A. For clarity, referring to FIG. 1B, mass member 30 is depicted therein in non-activated position 50. Activated positions 96 and 116 are referenced in FIG. 1B to illustrate locations within housing 12 where mass member 30 will be located when in activated positions 96 and 116. Referring to FIGS. 4A and 4B, if indicator 10 has been subjected to an acceleration event in direction 16 that caused mass member 30 to move to activated position 96 (FIG. 2B) and thereafter is subjected to another acceleration event in direction 18 (e.g., an unauthorized attempt to reseat mass member 30 in the non-activated position 50 or in response to some other impact event) of a level and/or magnitude to overcome the force(s) applied by leaf springs 56 and 58, leaf springs 56 and 58 both collapse or invert and mass member 30 moves from activated position 96, past non-activated position 50, to the activated position 116. For example, in response to the acceleration event in direction 18 of a level and/or magnitude to overcome the force(s) applied by leaf springs 56 and 58, leaf springs 56 and 58 both collapse or invert such that convex portions thereof apply a biasing force against wall 90 of mass member 30 to bias mass member 30 to activated position 116. Additionally, ends 68 and 80 of leaf spring 56 are drawn out of respective seats 62 and 74 and become positioned within respective indent regions 102 and 104. Thus, in response to movement of mass member 30 from activated position 96 to activated position 116, leaf springs 56 and 58 are biased in a same direction (e.g., toward wall 90 of mass member 30) and ends 68, 70, 80 and 82 of respective leaf springs 56 and 58 are located within indent regions 102 and 104, respectively, to prevent or substantially prevent leaf springs 56 and 58 to returning to seat 62, 64, 74 or 76, thereby further preventing or substantially preventing mass member 30 from returning (in a maintained durational state) to non-activated position 50 after being in an activated state.

Figure 5A:
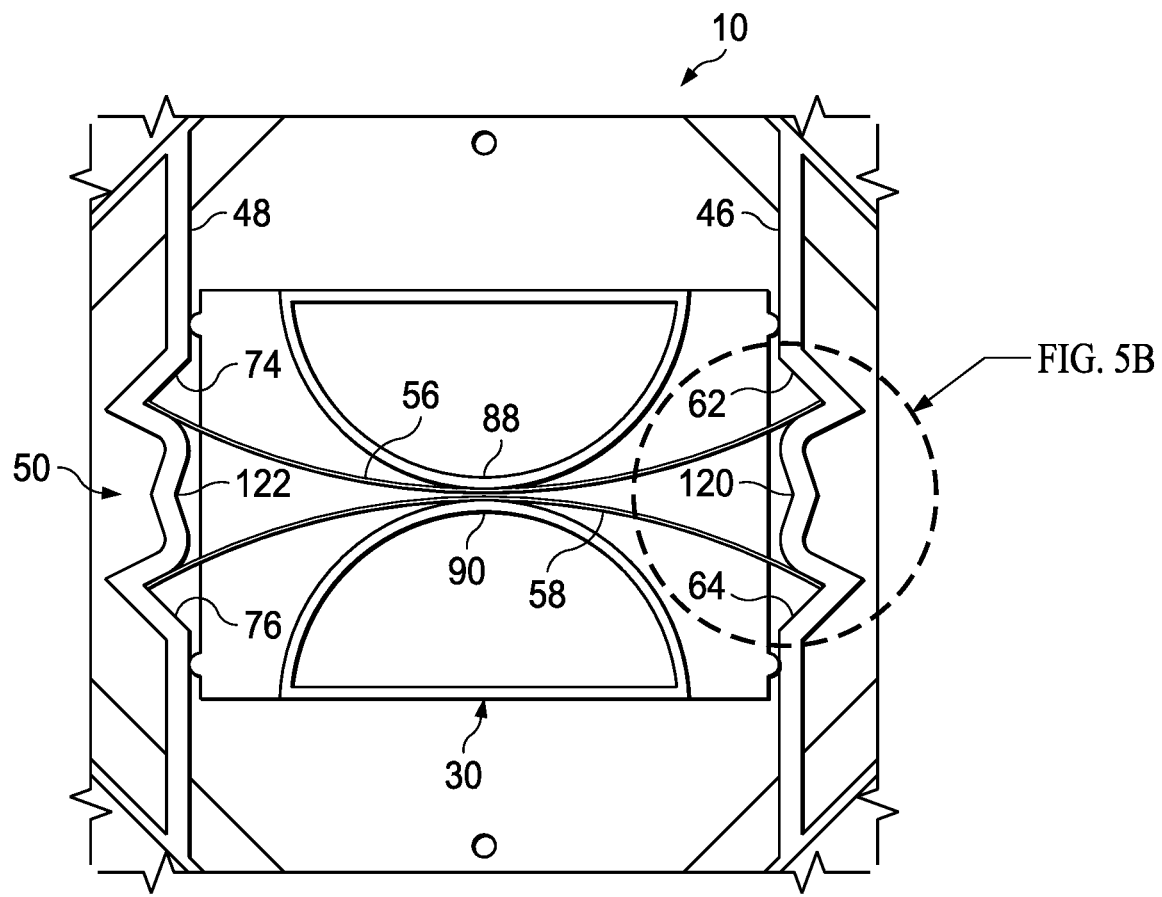
FIG. 5A is a diagram illustrating another embodiment of an impact indicator according to the present disclosure.
Figure 5B:
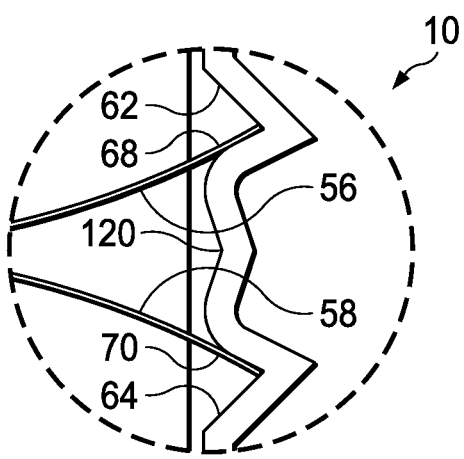
FIG. 5B is a diagram illustrating an enlarged view of a portion of the impact indicator illustrated in FIG. 5A in accordance with the present disclosure.
Figure 6:
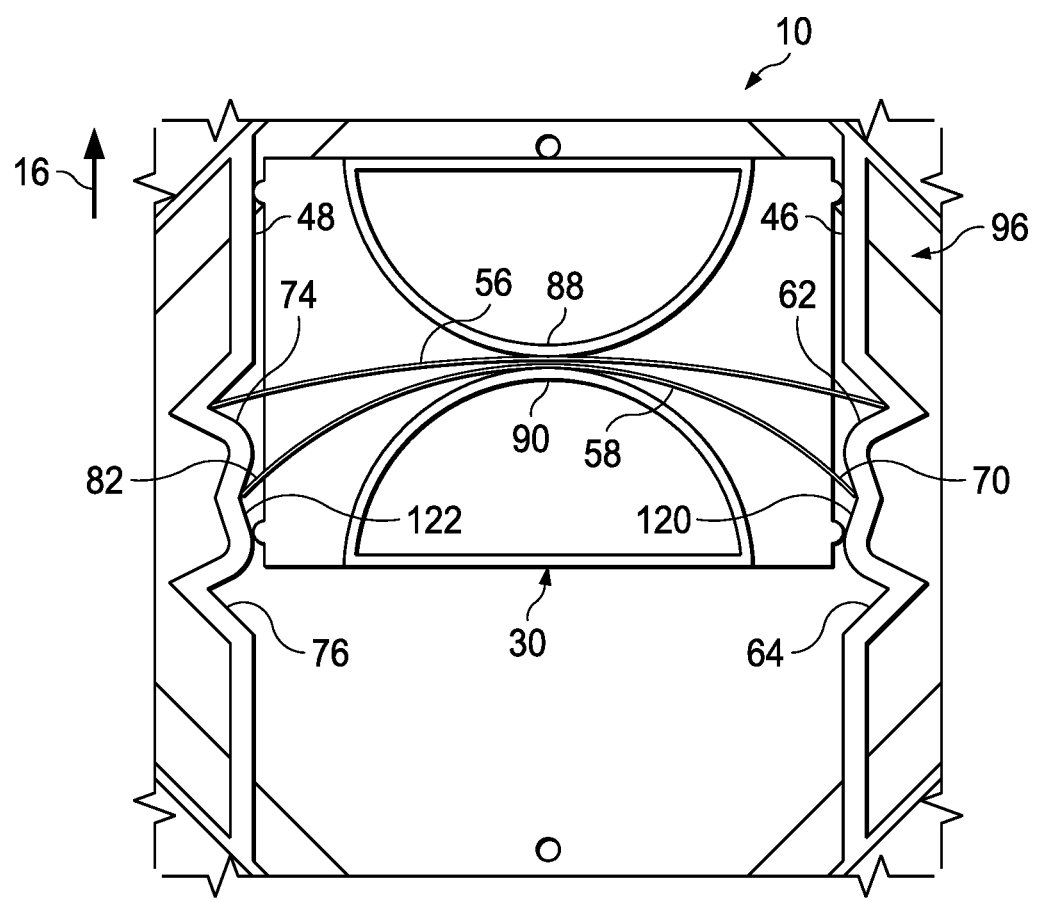
FIG. 6 is a diagram illustrating an enlarged view of a portion of the impact indicator illustrated in FIGS. 5A and 5B in an activated state in accordance with the present disclosure.

FIG. 5A is a diagram illustrating another embodiment of indicator 10 in accordance with the present disclosure, and FIG. 5B is a diagram illustrating an enlarged view of a portion of FIG. 5A of indicator 10. In the embodiment illustrated in FIGS. 5A and 5B, sidewalls 46 and 48 each have formed therein an additional spring seat 120 and 122, respectively. Seat 120 is located along sidewall 46 between seats 62 and 64, and seat 122 is located along sidewall 48 between seats 74 and 76. Similar to seats 62, 64, 74 and 76, seats 120 and 122 comprise a recessed area along respective sidewalls 46 and 48 for receiving ends 68/80 and 70/82 of respective leaf springs 56 and 58 in response to indicator 10 being subjected to an impact or acceleration event of sufficient magnitude to cause movement of mass member 30 (e.g., as described above in connection with FIGS. 2A, 3A, 3B, 4A and 4B). For example, FIG. 6 is a diagram illustrating indicator 10 shown in FIGS. 5A and 5B with mass member 30 located in the activated position 96. Because leaf springs 56 and 58 are configured having a length greater than a lateral width of the translation path for movement of mass member 30, the ends of leaf springs 56 and 58 will seek the widest lateral dimension between sidewalls 46 and 48 to relieve tension forces therein. Thus, for example, in response to indicator 10 being subjected to an acceleration event in direction 16 of a magnitude sufficient to overcome the bias forces of leaf springs 56 and 58, mas member 30 will move from non-activated position 50 toward activated position 96, leaf spring 56 will collapse and/or invert and apply a biasing force toward wall 88 of mass member 30, and ends 70 and 82 of leaf spring 58 will be drawn out of respective seats 64 and 76 and become located in respective seats 120 and 122. Seats 120 and 122 102 and 104 prevent or substantially prevent ends 70 and 82 of leaf spring 58 from returning to respective seats 64 and 76. Thus, if indicator 10 is subjected to another acceleration event in a direction opposite direction 16 (e.g., direction 18) in an attempt to reset and/or re-position mass member 30 in the non-activated position 50 after being in an activated state, indent regions 102 and 104 resist the return of ends 70 and 82 of leaf spring 58 to seats 64 and 76, thereby resulting in an additional bias force in the direction 16 that would need to be overcome in an opposite direction to effectuate movement of mass member 30 toward the non-activated position 50.

Figure 7A:
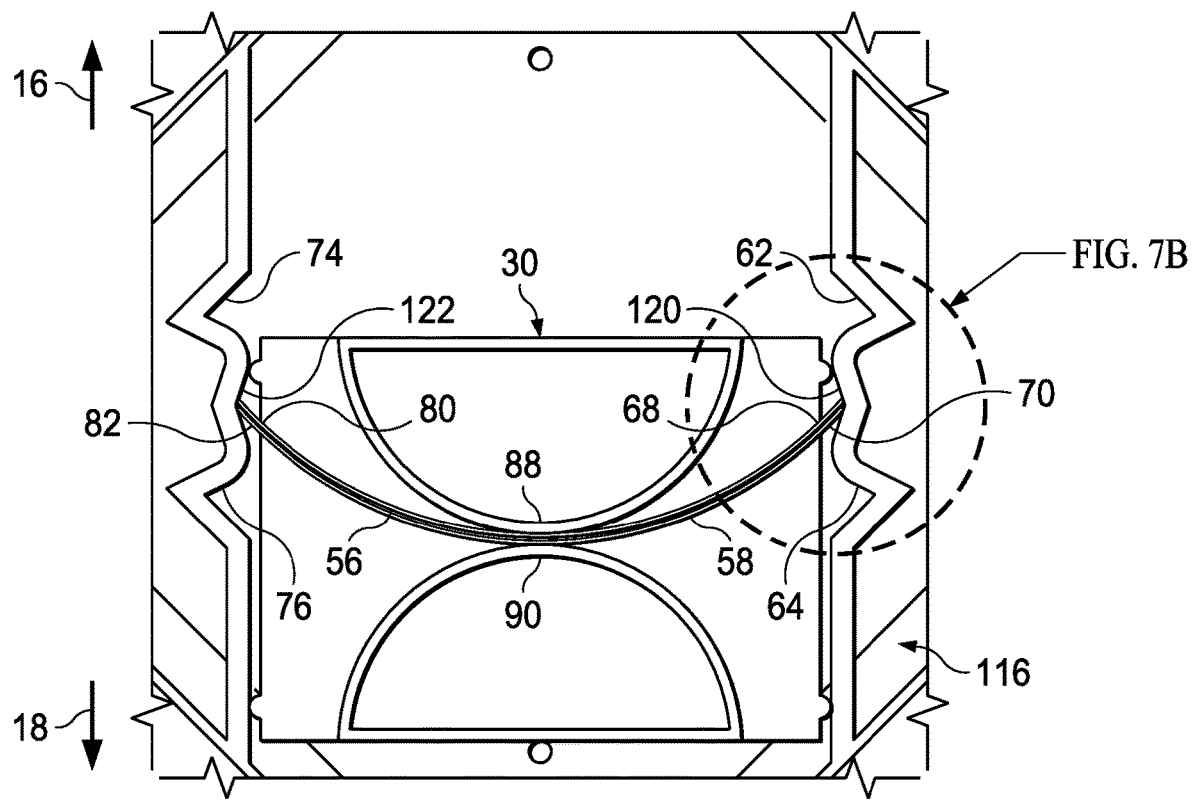
FIG. 7A is a diagram illustrating an enlarged view of a portion of the impact indicator illustrated in FIGS. 5A and 5B in another activated state in accordance with the present disclosure.
Figure 7B:
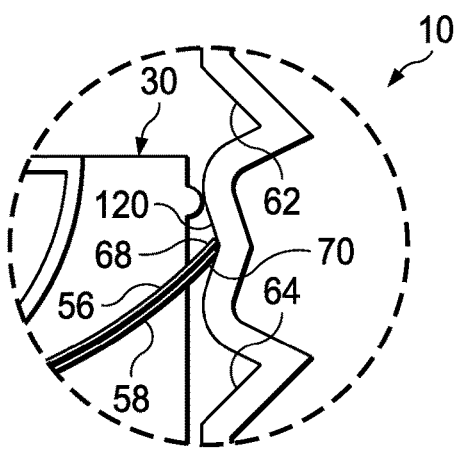
FIG. 7B is a diagram illustrating an enlarged view of a portion of the impact indicator illustrated in FIG. 7A in accordance with the present disclosure.

FIG. 7A is a diagram illustrating an enlarged view of a portion of indicator 10 of FIGS. 5A, 5B and 6 with mass member 30 located in activated position 116, and FIG. 7B is a diagram illustrating an enlarged view of a portion of FIG. 7A. If indicator 10 has been subjected to an acceleration event in direction 16 that caused mass member 30 to move to activated position 96 (FIGS. 6) and thereafter is subjected to another acceleration event in direction 18 (e.g., an unauthorized attempt to reseat mass member 30 in the non-activated position 50 or in response to some other impact event) of a level and/or magnitude to overcome the force(s) applied by leaf springs 56 and 58, leaf springs 56 and 58 both collapse or invert and mass member 30 moves from activated position 96, past non-activated position 50, to the activated position 116. For example, in response to the acceleration event in direction 18 of a level and/or magnitude to overcome the force(s) applied by leaf springs 56 and 58, leaf springs 56 and 58 both collapse or invert such that convex portions thereof apply a biasing force against wall 90 of mass member 30 to bias mass member 30 to activated position 116. Additionally, ends 68 and 80 of leaf spring 56 are drawn out of respective seats 62 and 74 and become positioned within respective seats 120 and 122. Thus, in response to movement of mass member 30 from activated position 96 to activated position 116, leaf springs 56 and 58 are biased in a same direction (e.g., toward wall 90 of mass member 30) and ends 68, 70, 80 and 82 of respective leaf springs 56 and 58 are located within seats 120 and 122, respectively, to prevent or substantially prevent leaf springs 56 and 58 to returning to seat 62, 64, 74 or 76, thereby further preventing or substantially preventing mass member 30 from returning (in a maintained durational state) to non-activated position 50 after being in an activated state.

Figure 8:
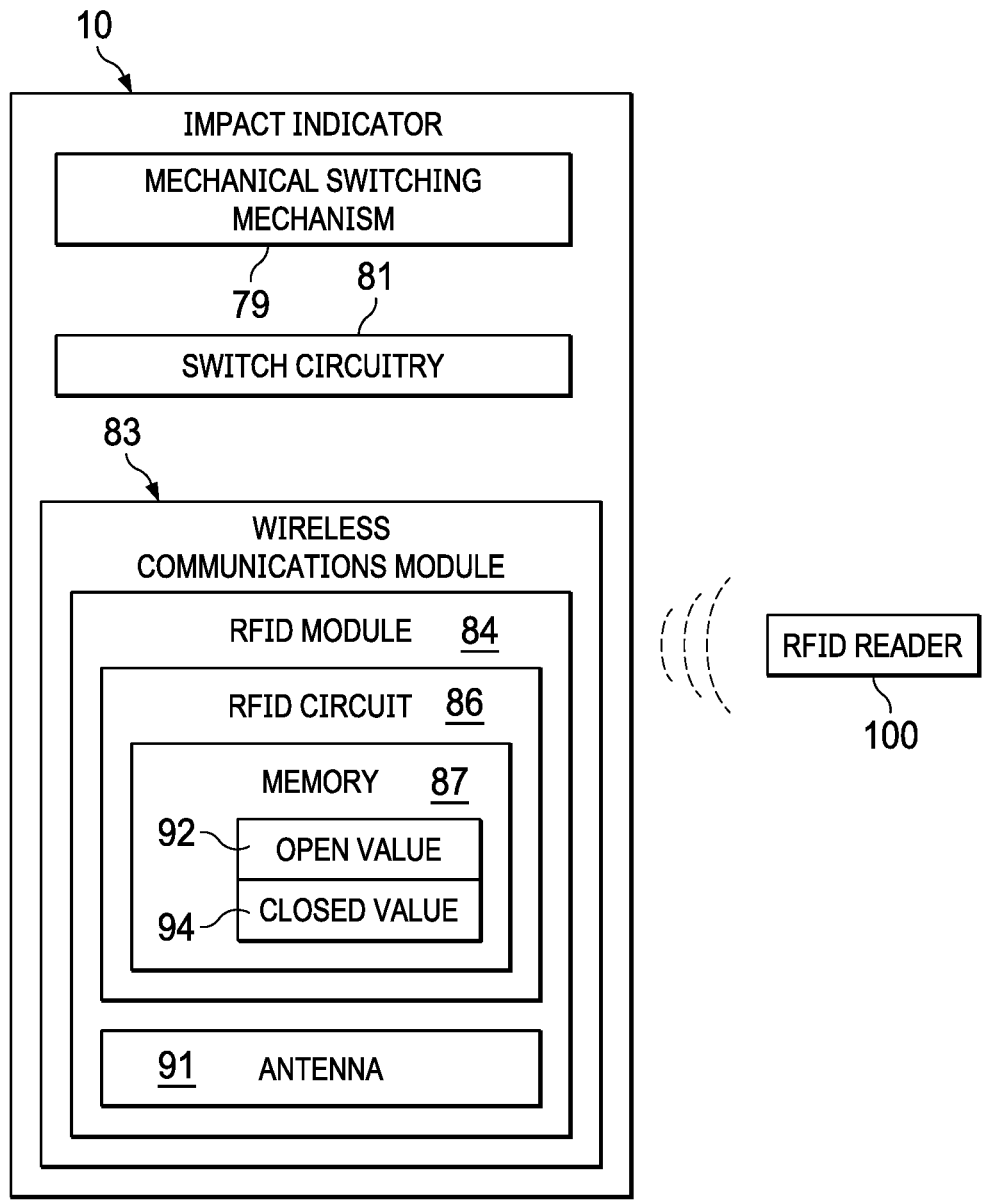
FIG. 8 is a block diagram illustrating an embodiment of an impact indicator according to the present disclosure.

FIG. 8 is a block diagram representing and illustrating an embodiment of indicator 10 in accordance with an embodiment of the present disclosure. In some embodiments, impact indicator 10 may be affixed (permanently or removably) to a printed circuit board and/or otherwise permanently or removably connected to electronic circuitry (e.g., such as a removable cartridge) such that, in response to receipt and/or detection of an acceleration event or impact condition of a sufficient magnitude, impact indicator 10 provides an electronic switch closure or opener that may thereby provide an electronic signal/indication of such event. In FIG. 8, indicator 10 includes a mechanical switching mechanism 79, switch circuitry 81, and a wireless communications module 83 coupled to switch circuitry 81. Mechanical switching mechanism 79 may be any mechanical device used to cause a state change in switch circuitry 81. For example, in some embodiments, mechanism 79 may comprise mass member 30. In such an embodiment (as will be described in greater detail below), movement of mass member 30 may cause a state change in switch circuitry 81 (e.g., changing from an open circuit condition to a closed circuit condition, or vice versa). Switch circuitry 81 may comprise one or more switch elements, contacts, and or circuits that are responsive to movement of mass member 30 (or other type of mechanical switching mechanism 79). Wireless communications module 83 is configured to wirelessly communicate information associated with a state of switch circuitry 81 indicating the activation state of indicator 10 (e.g., based on an open or closed circuit state of circuitry 81). For example, in one embodiment, wireless communications module 83 includes an RFID module 84. In some embodiments, RFID module 84 comprises a passive RFID module 84 (e.g., a passive RFID tag) having an RFID integrated circuit or circuitry 86 (e.g., disposed on or as part of a printed circuit board) and a memory 87, along with an antenna 91. As a passive RFID module 84, indicator 10 does not contain a battery (e.g., power is supplied by an RFID reader 100). For example, when radio waves from reader 100 are encountered by module 84, antenna 91 forms a magnetic field, thereby providing power to module 84 to energize circuit 86. Once energized/activated, module 84 may output/transmit information encoded in memory 87. However, it should be understood that, in some embodiments, RFID module 84 may comprise an active RFID module 84 including a power source (e.g., a battery) that may be configured to continuously, intermittently, and/or according to programmed or event triggers, broadcast or transmit certain information. It should also be understood that wireless communications module 83 may be configured for other types of wireless communication types, modes, protocols, and/or formats (e.g., short-message services (SMS), wireless data using General Packet Radio Service (GPRS)/3G/4G or through public interne via Wi-Fi, or locally with other radio-communication protocol standards such as Wi-Fi, Z-Wave, ZigBee, Bluetooth®, Bluetooth® low energy (BLE), LoRA, NB-IoT, SigFox, Digital Enhanced Cordless Telecommunications (DECT), or other prevalent technologies). As will be described further below, impact indicator 10 functions as a shock fuse such that, in response to receipt of a particular level and/or magnitude of a shock/acceleration event, an electrically conductive member either opens or closes an electronic switch. This configuration enables impact indicator 10 to be used as a passive impact sensor/indicator that can be used as part of an electronic signal or circuit. In some embodiments, the impact sensing capabilities/functions of impact indicator 10 of the present disclosure needs no power while in the monitoring state. When activated, impact indicator 10 completes or opens an electrical path of a circuit and thus could be integrated into most any electronic monitoring system.

In the illustrated embodiment, memory 87 includes at least two different stored and/or encoded values 92 and 94. For example, value 92 may correspond to a value outputted/transmitted by module 84 when switch circuitry 81 is in an open circuit condition or state, and value 94 may correspond to a value outputted/transmitted by module 84 when switch circuitry 81 is in a closed circuit condition or state. As an example, the value 94 may represent an RFID tag identification (ID) number not having an activated impact switch circuitry 81, and the RFID tag's ID number may have an additional character (e.g., "0") placed at the end thereof. Value 92 may represent the RFID ID number having an activated impact switch circuitry 81, and the RFID tag's ID number may have an additional character at the end thereof being different from the additional character carried by value 94 (e.g., "1"). In the illustrated embodiment, RFID module 84 (e.g., circuitry 86) is coupled to switch circuitry 81 and can detect whether switch circuitry 81 is in an open or closed circuit condition or state. Thus, for example, switch circuitry 81 may initially be in closed circuit condition or state. Thus, if energized/activated, module 84 would transmit value 94 to reader 100. If indicator were to be subject to an impact event, mechanism 79 may cause a change in circuitry 81 that would result in circuitry 81 being in an open circuit condition or state. Thus, if now energized/activated (e.g., after the impact event), module 84 would instead transmit value 92 to reader 100. Thus, embodiments of the present invention enable indicator 10 to monitor sensitive products/objects to which it is attached for potential damage caused by shock using electronic indicators (e.g., RFID readers) while indicator 10 does not contain or require any internal power source (e.g., a battery).

The present invention may include computer program instructions at any possible technical detail level of integration (e.g., stored in a computer readable storage medium (or media) (e.g., memory 87) for causing a processor to carry out aspects of the present invention. Computer readable program instructions described herein can be downloaded to respective computing/processing devices (e.g., communications module 83 and/or RFID module 84). Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. In some embodiments, electronic circuitry (e.g., circuitry 86) including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to illustrations and/or block diagrams of methods and/or apparatus according to embodiments of the invention. It will be understood that each block of the illustrations and/or block diagrams, and combinations of blocks in the illustrations and/or block diagrams, may represent a module, segment, or portion of code, can be implemented by computer readable program instructions. These computer readable program instructions may be provided to a processor or other programmable data processing apparatus to produce a machine, such that the instructions, which execute via the processor, create means for implementing the functions/acts specified in the illustrations and/or block diagram block or blocks. These computer readable program instructions may also be stored in a computer readable storage medium that can direct a computing device, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks. Switch circuitry 81, wireless communications module 83, and/or RFID module 84 may be implemented in any suitable manner using known techniques that may be hardware-based, software-based, or some combination of both. For example, switch circuitry 81, wireless communications module 83, and/or RFID module 84 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). As will be appreciated by one skilled in the art, aspects of the present disclosure may be embodied as a system, method or computer program product. Accordingly, aspects of the present disclosure may take the form of a hardware embodiment, a software embodiment (including firmware, resident software, microcode, etc.) or an embodiment combining software and hardware aspects that may all generally be referred to herein as a "circuit," "module" or "system."

Figure 9:
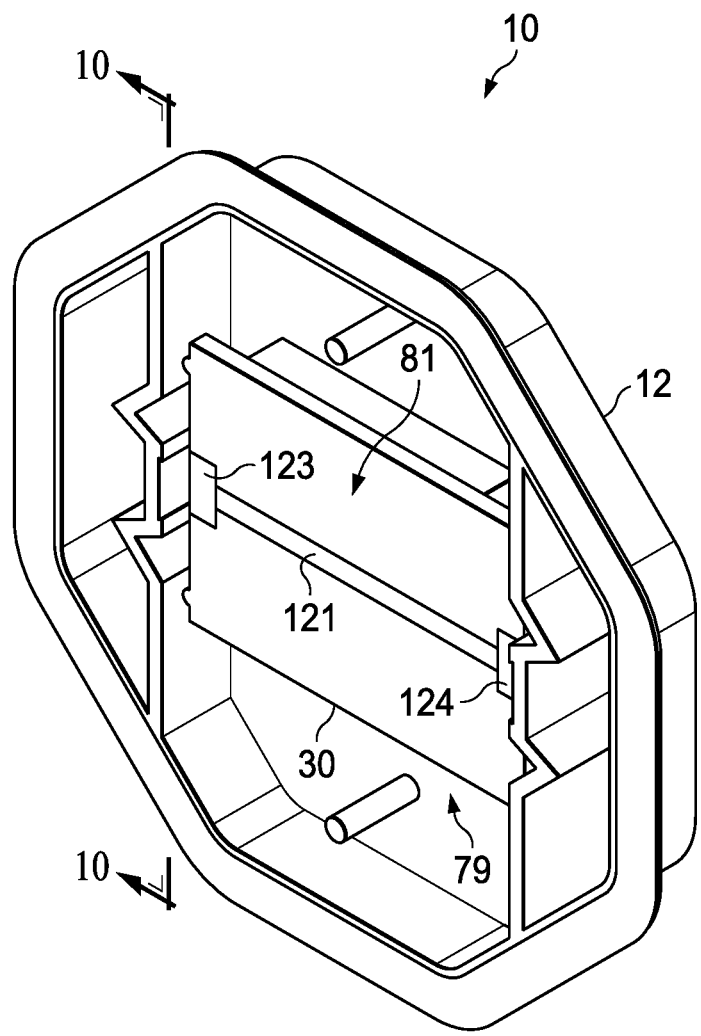
FIG. 9 is a diagram illustrating a perspective rear view of a portion of an embodiment of the impact indicator of FIG. 8 according with the present disclosure.
Figure 10:
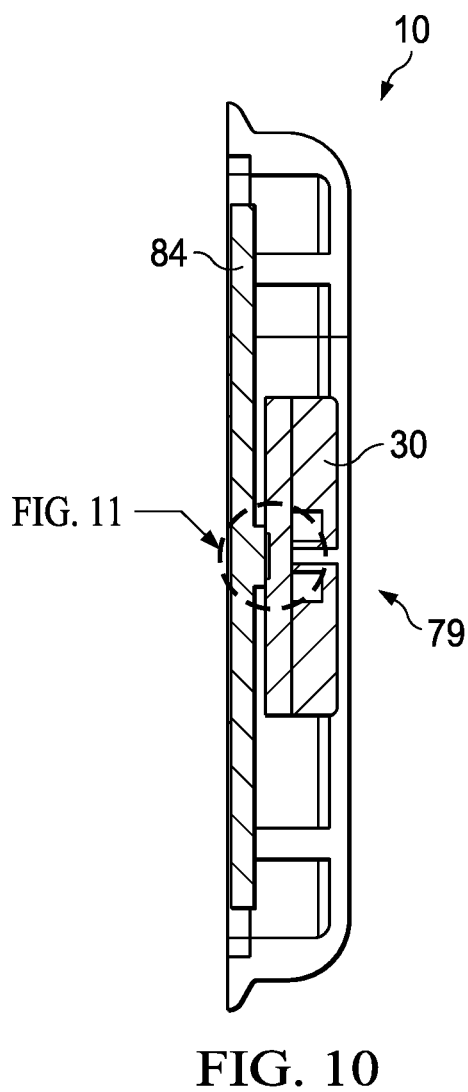
FIG. 10 is a diagram illustrating a section view of an embodiment of the impact indicator of FIG. 9 according to the present disclosure taken along the line 10-10 in FIG. 9.
Figure 11:
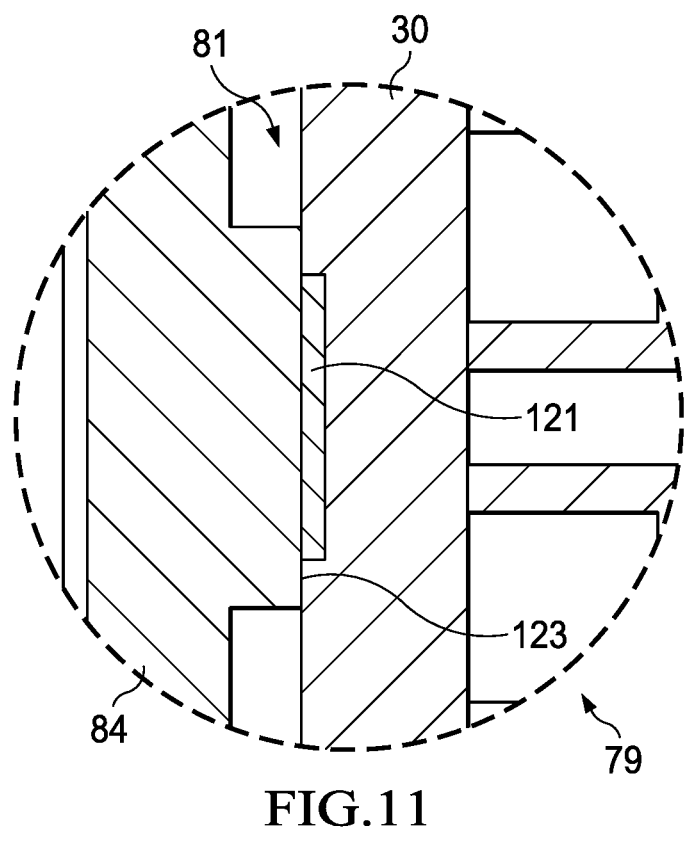
FIG. 11 is a diagram illustrating an enlarged view of a portion of the impact indicator depicted in FIG. 10 according to an embodiment of the present disclosure.

FIG. 9 is a diagram illustrating a perspective rear view of a portion of an embodiment of indicator 10 in accordance with the present disclosure, FIG. 10 is a diagram illustrating a section view of indicator 10 of FIG. 9 in accordance with an embodiment of the present invention taken along the line 10-10 in FIG. 9, and FIG. 11 is a diagram illustrating an enlarged view of a portion of indicator 10 depicted in FIG. 10. In the embodiment illustrated in FIGS. 9-11, mechanical switching mechanism 79 is formed by mass member 30 having affixed or secured thereto an electrically conductive element 121. In some embodiments, mass member 30 may be formed of a non-metallic or non-conductive material such that conductive element 121 may be secured thereto (e.g., affixed by bonding, fasteners, etc.). In the illustrated embodiment, conductive element 121 extends transversely across mass member 30 in a direction generally orthogonal to the direction of movement of mass member 30 within housing 12 (e.g., movement directions 16 and 18 depicted in FIG. 1B). Conductive member 120 is configured to connect with and/or engage spaced apart contacts 123 and 124 of switch circuitry 81 to cause circuitry 81 to be in either an open circuit condition or state (e.g., when conductive element 121 is disengaged from contacts 123 and 124) or a closed circuit condition or state (e.g., when conductive element 121 is in engagement with contacts 123 and 124). In the illustrated embodiment, conductive element 121 extends linearly across mass member 30 in the direction described above; however, it should be understood that the direction, size, shape, etc., of element 121 may vary (e.g., based on the position and/or locations of contacts 123 and 124). Contacts 123 and 124 comprise electrically conductive pads or segments of circuitry 81. For example, circuitry 81 may comprise one or more electrically conductive wires, traces, pads, posts, and/or electronic components that are coupled to RFID module 84. In FIG. 9, RFID module 84 is omitted from view to better illustrate mass member 30 with conductive element 121; however, it should be understood that contacts 123 and 124 may be coupled to and/or otherwise form part of RFID module 84.

Thus, in operation, in the embodiment illustrated in FIGS. 9-11, circuitry 81 is initially in a closed circuit state when mass member 30 is in the non-activated or initial pre-detection state/position 50 (FIG. 1B (i.e., prior to being subjected to an acceleration event)). Thus, if RFID module 84 is activated or energized by RFID reader 100 while mass member 30 is in the non-activated or initial pre-detection state 50 (i.e., prior to being subjected to an acceleration event), RFID module 84 would detect the closed circuit condition of circuitry 81 and output or transmit value 94. Responsive to indicator 10 being subjected to an impact or acceleration event of a magnitude sufficient to cause movement of mass member 30 from the initial non-activated position 50 to an activated position (e.g., position 96 or 116 (FIGS. 2B and 7A)), the state of circuitry 81 would change from being in a closed circuit condition to being in an open circuit condition because conductive element 121 would have moved away and become disengaged from contacts 123 and 124. Thus, responsive to movement of mass member 30 from the initial non-activated position 50 to an activated position 96 or 116, if RFID module 84 is activated or energized by RFID reader 100, RFID module 84 would detect the open circuit condition of circuitry 81 and output or transmit value 92 instead of value 94. Thus, a change in the switch circuitry 81 state causes a change in a value output by RFID module 84 when activated.

Additionally, embodiments of impact indicator 10 provide a non-reversible indication of impact activation. For example, as described above in connection with FIG. 4A, once mass member 30 leaves the non-activated or pre-activated position 50 in response to an impact event, mass member 30 would remain in either position 96 or 116 (e.g., due to leaf springs 56 and 58), thereby resulting in circuitry 81 remaining in an open state condition and RFID module 84 transmitting value 92 when energized.

In the above description and illustrated embodiment of FIG. 9-11, circuitry 81 is in a closed circuit condition when mass member 30 is in the non-activated or pre-activated position 50. However, it should be understood that indicator 10 may be alternately configured such that circuitry 81 is instead in an open circuit condition when mass member 30 is in the non-activated or pre-activated position 50, and circuitry 81 is in a closed circuit condition when mass member is in position 96 or 116 (e.g., by placing a pair of contacts 123 and 124 near each of positions 96 and 116 (instead of near position 50) which would engage conductive element 121 when mass member 30 is in respective positions 96 or 116). Alternatively, mass member 30 could have multiple spaced apart conductive elements 121 (e.g., one near an upper portion of mass member 30 and one near a lower portion of mass member 30) such that movement of mass member 30 into position 96 or 116 would cause a respective conductive element 121 to come into engagement with contacts 123 and 124 located near position 50 (e.g., the lower conductive element 121 engaging contacts 123 and 124 located near position 50 when mass member is in position 96, and vice versa for when mass member 30 is in position 116). Thus, it should be understood that the placement of conductive element 121 and/or contacts 123 and 124 may vary while enabling RFID module 84 to transmit different values based on whether circuitry 81 is in an open or closed circuit state (based on whether indicator has been subjected to an impact event).

FIG. 12 is a diagram illustrating another embodiment of indicator 10 in accordance with the present disclosure, FIG. 13 is a diagram illustrating a bottom view of indicator 10 of FIG. 12 in accordance with an embodiment of the present invention taken along the line 13-13 in FIG. 12, and FIG. 14 is a diagram illustrating a side view of indicator 10 depicted in FIG. 12 taken along the line 14-14 of FIG. 12. In FIGS. 12-14, most elements of indicator 10 (e.g., those depicted and described in connection with FIGS. 1-7) have been omitted for clarity and ease of description; however, it should be understood that indicator 10 may be similarly configured as depicted and described in connection with FIGS. 1-7. In the embodiment illustrated in FIGS. 12-14, another embodiment of switching mechanism 79, circuitry 81, and RFID module 84 coupled to switch circuitry 81 are depicted. In the illustrated embodiment, switching mechanism 79 is formed by mass member 30 (e.g., without conductive element 121 (FIGS. 9-11)). For ease of description and clarity, mass member 30 is not depicted in FIGS. 13 and 14. Switch circuitry 81 includes conductive switch elements 130 and 132, and conductive contacts 140, 142, 144, and 146. Switch elements 130 and 132 are located generally in or near respective positions 96 and 116 such that as mass member 30 moves into position 96 or 116 from position 50, mass member 30 contacts or otherwise engages respective switch element 130 or 132. In the illustrated embodiment, switch element 130 is fixedly coupled to contact 140, and switch element 132 is fixedly coupled to contact 146. Switch elements 130 and 132, and contacts 140, 142, 144, and 146, may comprise conductive wires, pins, posts, pads, traces, etc.

In the embodiment illustrated in FIGS. 12-14, switch element 130 includes contiguous switch element segments 150, 152, and 154 where segment 150 is fixedly coupled to contact 140. Switch element 130 comprises a flexible switch element 130 such that segments 150, 152, and 154 are movable in angular relationship relative to each other, and segment 150 may bend/rotate relative to and/or with contact 140. Similarly, switch element 132 includes contiguous switch element segments 156, 158, and 160 where segment 156 is fixedly coupled to contact 146. Switch element 132 also comprises a flexible switch element 132 such that segments 156, 158, and 160 are movable in angular relationship relative to each other, and segment 156 may bend/rotate relative to and/or with contact 146. In the illustrated embodiment, switch elements 130 and 132 include non-linear switch element segments 150, 152, 154, 156, 158, and 160, respectively. For example, in the illustrated embodiment, switch elements 130 and 132 are formed having a generally Z-shaped configuration (e.g., when viewed from a position orthogonal to a plane of movement of switch elements 130 and 132); however, it should be understood that elements 130 and 132 may be otherwise configured.

As best depicted in FIG. 12, circuitry 81 is initially in an open circuit state when mass member 30 is in the non-activated or initial pre-detection state/position 50 (i.e., prior to being subjected to an acceleration event). For example, in this embodiment, in the non-activated or initial pre-detection state/position 50 of mass member 30, segments 154 and 160 are each spaced apart from and/or in disengagement with respective contacts 142 and 144. Thus, if RFID module 84 is activated or energized by RFID reader 100 while mass member 30 is in the non-activated or initial pre-detection state 50 (i.e., prior to being subjected to an acceleration event), RFID module 84 would detect the open circuit condition of circuitry 81 and output or transmit value 92. Responsive to indicator 10 being subjected to an impact or acceleration event of a magnitude sufficient to cause movement of mass member 30 from the initial non-activated position 50 to an activated position (e.g., position 96 or 116), the state of circuitry 81 would change from being in an open circuit condition to a closed circuit condition because the movement of mass member 30 would result in mass member 30 contacting a respective switch element 130 or 132 and cause the respective switch element 130 or 132 to come in contact with and/or engage respective contact 142 or 144, thereby closing a respective circuit. Thus, responsive to movement of mass member 30 from the initial non-activated position 50 to an activated position 96 or 116, if RFID module 84 is activated or energized by RFID reader 100, RFID module 84 would detect the closed circuit condition of circuitry 81 and output or transmit value 94 instead of value 92. Thus, a change in the switch circuitry 81 state causes a change in a value output by RFID module 84 when activated.

In the embodiment illustrated in FIGS. 12-14, each switch element 130 and 132 may be part of and/or otherwise form a different, separate circuit (circuit 162 and 164, respectively) such that RFID module 84 can detect whether either circuit 162 or 164 is in an open or closed circuit condition. For example, if indicator 10 has been subjected to an impact event causing mass member 30 to move from position 50 to position 96, circuit 164 would remain in an open circuit condition, while circuit 162 would have gone from an open circuit condition to a closed circuit condition. RFID module 84 may be configured to function similar to a digital logic OR gate such that a closed value 94 is output if one or both circuits 162 and 164 are in a closed circuit condition. In the embodiment illustrated in FIGS. 12-14, switch circuitry 81 is in an open circuit condition when mass member 30 is in the non-activated or initial pre-detection state/position 50 (i.e., prior to being subjected to an acceleration event). However, it should be understood that indicator 10 may be otherwise configured (e.g., where circuits 162 and 164 would initially be in a closed circuit condition (e.g., switch elements 130 and 132 each in engagement with respective contacts 142 and 144 where movement of mass member into position 96 or 116 causes mass member 30 to disengage a respective switch element 130 or 132 from respective contacts 142 or 144.

Figure 15A:
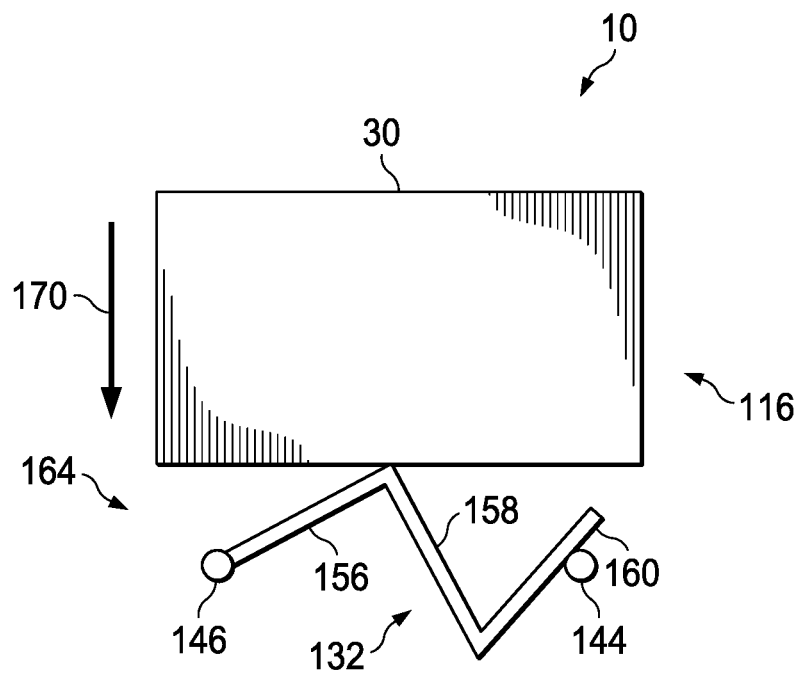
FIGS. 15A and 15B are diagrams illustrating a portion of the impact indicator depicted in FIGS. 12-14 according to an embodiment of the present disclosure.
Figure 15B:
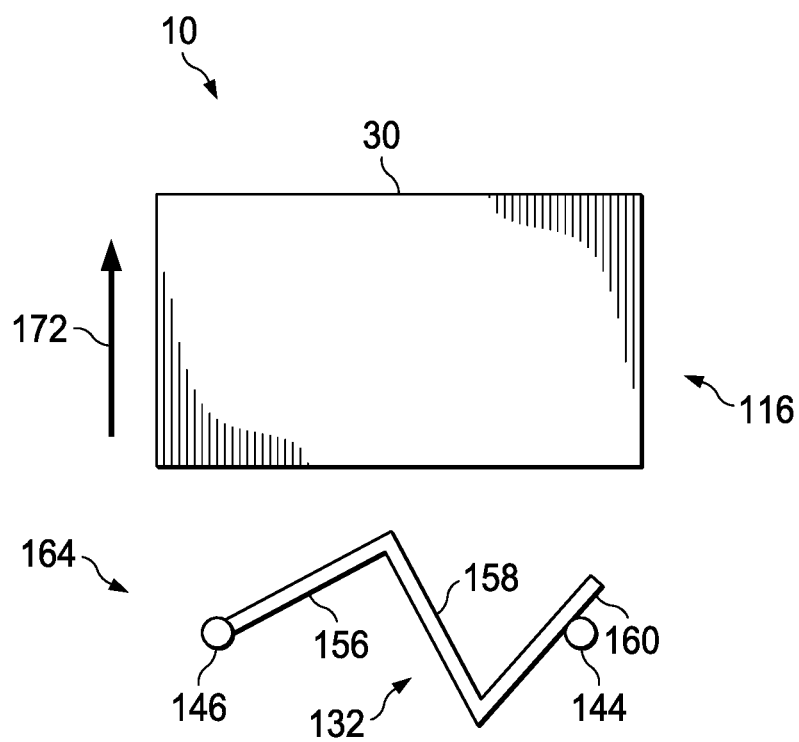

FIGS. 15A and 15B are diagrams illustrating a portion of indicator 10 depicted in FIGS. 12-14. In FIGS. 15A and 15B, only switch element 132 is depicted; however, it should be understood that the operation and/or function of switch element 130 is similar to that hereinafter described in connection with switch element 132. In FIG. 15A, indicator 10 has been subjected to an impact event such that mass member 30 has moved in the direction 170 into position 116 such that the movement of mass member 30 towards position 116 has caused mass member 30 to contact switch element 132, thereby causing switch element segment 160 to engage contact 144 to place circuit 164 from an open circuit condition into a closed circuit condition. In FIG. 15B, in response to indicator 10 being subjected to another impact event causing mass member 30 to move in direction 172 away from position 116, although mass member 30 has disengaged from switch element 132 (i.e., mass member 30 is no longer contacting or applying a force to switch element 132), switch element 132 remains in engagement with contact 144 such that circuit 164 remains in a closed circuit condition. In this embodiment, switch element 132 comprises a flexible and/or deformable switch element 132 such that a force applied to switch element 132 by mass member 30 causes switch element 132 to compress within the space directly between contacts 144 and 146, thereby resulting in switch element 132 being maintained in a compressed state between contacts 144 and 146. Being in a compressed state, switch element 132 continues to apply a force to contact 144, thereby maintaining circuit 164 in a closed circuit state after mass member 30 has moved away from position 116 (or away from contacting switch element 132). Thus, embodiments of the present invention provide an irreversible indication of impact activation by maintaining circuit 164 in a closed circuit state once circuit 164 has gone from an open circuit state to a closed circuit state. In the above description, circuit 164 is initially in an open circuit condition and then becomes a closed circuit in response to movement of mass member 30 against switch element 132. However, it should be understood that the open/closed circuit condition or operation could be reversed (e.g., initially in a closed circuit condition where switch element 132 is in engagement with contact 144 where movement of mass member 30 against switch element 132 causes switch element 132 to disengage from contact 144). In this alternate embodiment, another contact or the configuration of switch element 132 may cause circuit 164 to remain in an open circuit state even after mass member 30 moves away from position 116.

FIG. 16 is a diagram illustrating another embodiment of impact indicator 10 in accordance with the present disclosure, FIG. 17 is a diagram illustrating a bottom view of impact indicator 10 of FIG. 16 in accordance with an embodiment of the present disclosure viewed from the line 17-17 in FIG. 16, and FIG. 18 is a diagram illustrating a section view of impact indicator 10 depicted in FIG. 16 in accordance with an embodiment of the present disclosure taken along the line 18-18 of FIG. 16. In FIGS. 16-18, most elements of indicator 10 (e.g., those depicted and described in connection with FIGS. 1-7) have been omitted for clarity and ease of description; however, it should be understood that indicator 10 may be similarly configured as depicted and described in connection with FIGS. 1-7. In the embodiment illustrated in FIGS. 16-18, another embodiment of switching mechanism 79, circuitry 81, and RFID module 84 coupled to switch circuitry 81 are depicted. In the illustrated embodiment, switching mechanism 79 is formed by mass member 30 (e.g., without conductive element 121 (FIGS. 9-11)). For ease of description and clarity, mass member 30 is not depicted in FIGS. 17 and 18. Switch circuitry 81 includes conductive switch elements 170 and 172, and conductive contacts 180, 182, 184, and 186. Switch elements 170 and 172 are located generally in or near respective positions 96 and 116 such that as mass member 30 moves into position 96 or 116 from position 50, mass member 30 contacts or otherwise engages respective switch element 170 or 172. In the illustrated embodiment, switch element 170 is fixedly coupled to contact 180, and switch element 172 is fixedly coupled to contact 186. Switch elements 170 and 172, and contacts 180, 182, 184, and 186, may comprise conductive wires, pins, posts, pads, traces, etc.

In the embodiment illustrated in FIGS. 16-18, switch elements 170 and 172 are arcuately shaped (e.g., when viewed from a position orthogonal to a plane of movement of switch elements 170 and 172) having a convex portion thereof disposed toward mass member 30. In some embodiments, switch elements 170 and 172 comprise flexible switch elements 170 and 172 such that switch elements 170 and 172 may bend/rotate relative to and/or with respective contacts 180 and 186. In the illustrated embodiment (as best illustrated in FIG. 18 relative to contact 182), contacts 182 and 184 are disposed at an angle and/or incline toward mass member 30 (e.g., toward respective switch elements 170 and 172) such that contacts 182 and 184 are disposed at an acute angle relative to a plane of movement of mass member 30 (and respective switch elements 170 and 172). Although FIG. 18 only depicts contacts 182 and 186 (due to the location of the section view), it should be understood that contacts 184 and 180 are similarly configured (e.g., contact 184 disposed at an acute angle toward mass member 30/switch element 172).

As best illustrated in FIG. 17, switch element 172 extends toward contact 184 and bends downwardly near a distal end thereof (e.g., toward a plane parallel to a plane of movement of mass member 30/switch element 172 but closer to a base attachment location of contact 184). For example, in the illustrated embodiment, switch element 172 includes contiguous switch element segments 190, 192, and 194. Segment 190 is fixedly coupled to contact 186 at a proximal end thereof and extends in a direction generally toward contact 184. As segment 190 approaches a location of contact 184 (e.g., prior to reaching contact 184), segment 190 transitions to segment 192 (e.g., an approximate right angle) where segment 192 extends in a direction toward module 84 (i.e., in a direction toward a base of contact 184). Segment 192, prior to reaching module 84, transitions to segment 194 which extends in a direction similar to segment 190 (e.g., an approximate right angle to segment 192). It should be understood that switch element 170 is similarly configured (e.g., bending downwardly near a distal end thereof).

In operation, as best depicted in FIG. 16, circuitry 81 is initially in an open circuit state when mass member 30 is in the non-activated or initial pre-detection state/position 50 (i.e., prior to being subjected to an acceleration event). For example, in this embodiment, in the non-activated or initial pre-detection state/position 50 of mass member 30, switch elements 170 and 172 are each spaced apart from and/or in disengagement with respective contacts 182 and 184. Thus, if RFID module 84 is activated or energized by RFID reader 100 while mass member 30 is in the non-activated or initial pre-detection state 50 (i.e., prior to being subjected to an acceleration event), RFID module 84 would detect the open circuit condition of circuitry 81 and output or transmit value 92. Responsive to indicator 10 being subjected to an impact or acceleration event of a magnitude sufficient to cause movement of mass member 30 from the initial non-activated position 50 to an activated position (e.g., position 96 or 116), the state of circuitry 81 would change from being in an open circuit condition to a closed circuit condition because the movement of mass member 30 would result in mass member 30 contacting a respective switch element 170 or 172 and cause the respective switch element 170 or 172 to come in contact with and/or engage respective contact 182 or 184, thereby closing a respective circuit. Thus, responsive to movement of mass member 30 from the initial non-activated position 50 to an activated position 96 or 116, if RFID module 84 is activated or energized by RFID reader 100, RFID module 84 would detect the closed circuit condition of circuitry 81 and output or transmit value 94 instead of value 92. Thus, a change in the switch circuitry 81 state causes a change in a value output by RFID module 84 when activated.

In the embodiment illustrated in FIGS. 16-18, distal ends of switch elements 170 and 172 and angled downwardly toward a base of respective contacts 182 and 184, and contacts 182 and 184 are disposed at an acute angle toward respective switch elements 170 and 172, to reduce a likelihood of switch elements 170 and 172 from riding up and over a respective contact 182 and 184 (e.g., response to movement of mass member 30). As described above in connection with FIGS. 12-14, each switch element 170 and 172 may be part of and/or otherwise form a different, separate circuit (e.g., circuit 162 and 164, respectively) such that RFID module 84 can detect whether either circuit 162 or 164 is in an open or closed circuit condition. For example, if indicator 10 has been subjected to an impact event causing mass member 30 to move from position 50 to position 96, circuit 164 would remain in an open circuit condition, while circuit 162 would have gone from an open circuit condition to a closed circuit condition. RFID module 84 may be configured to function similar to a digital logic OR gate such that a closed value 94 is output if one or both circuits 162 and 164 are in a closed circuit condition. Further, embodiments of indicator 10 provide an irreversible indication of activation. For example, as described further in connection with FIGS. 1-7, once indicator 10 has been subject to an impact condition of a sufficient magnitude to move mass member away from position 50, spring members 40 and 42 maintain mass member 30 in either position 96 or 116, thereby maintaining switch elements 170 and/or 172 in engagement with respective contacts 182 and 184.

Figure 19:
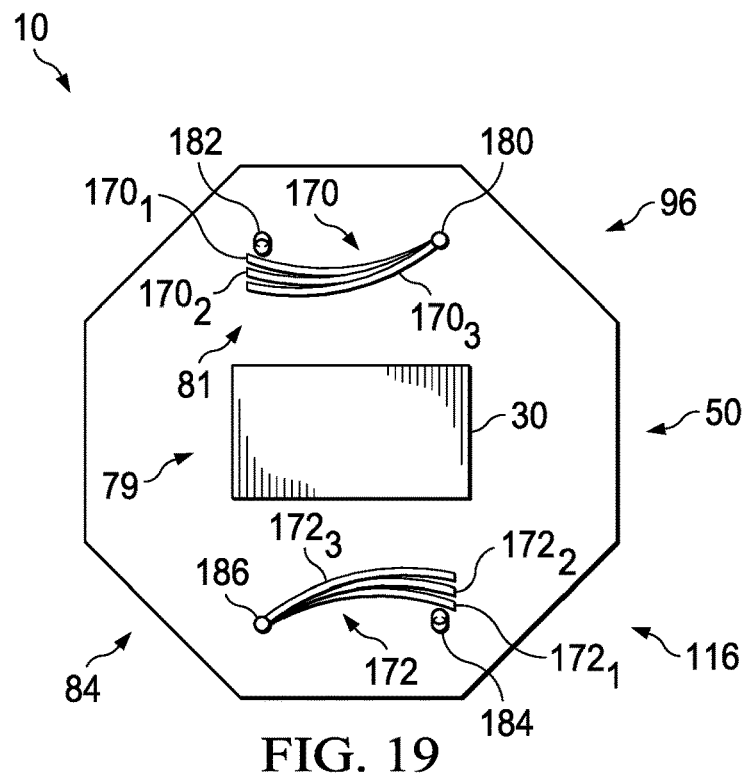
FIG. 19 is a diagram illustrating another embodiment of an impact indicator in accordance with the present disclosure.

FIG. 19 is a diagram illustrating another embodiment of impact indicator 10 in accordance with the present disclosure. In the embodiment illustrated in FIG. 19, indicator 10 is configured similarly to as depicted and described in connection with FIGS. 16-18 except instead of a single switch element 170 and 172, a plurality of distinct switch elements 170 and 172 are coupled to respective contacts 180 and 186. For example, in the illustrated embodiment, three switch elements 170 (e.g., switch elements 170$_1$, 170$_2$, and 170$_3$) are coupled to contact 180, and three switch elements 172 (e.g., switch elements 172$_1$, 172$_2$, and 172$_3$) are coupled to contact 186. It should be understood that a greater or fewer quantity of switch elements 170 and 172 may be used. In the illustrated embodiment, multiple switch elements 170 and 172 are used to increase the likelihood of initiating a circuit state change (e.g., triggering a closed circuit condition from an open circuit condition, or vice versa). For example, using multiple switch elements 170 and 172 increases the likelihood of a circuit state change should one or more switch elements 170 and 172 fail or fail to engage respective contacts 182 and 184.

Figure 20:
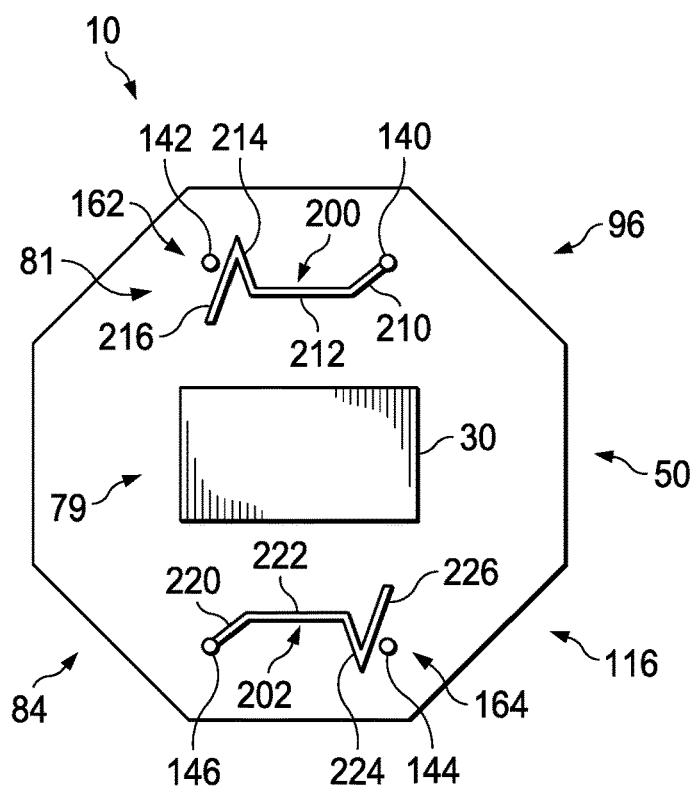
FIG. 20 is a diagram illustrating another embodiment of an impact indicator in accordance with the present disclosure.

FIG. 20 is a diagram illustrating another embodiment of impact indicator 10 in accordance with the present disclosure. In FIG. 20, most elements of indicator 10 (e.g., those depicted and described in connection with FIGS. 1-7) have been omitted for clarity and ease of description; however, it should be understood that indicator 10 may be similarly configured as depicted and described in connection with FIGS. 1-7. In the embodiment illustrated in FIG. 20, another embodiment of switching mechanism 79, circuitry 81, and RFID module 84 coupled to switch circuitry 81 are depicted. In the illustrated embodiment, switching mechanism 79 is formed by mass member 30 (e.g., without conductive element 121 (FIGS. 9-11)). Impact indicator 10 of FIG. 20 is configured similar to as that depicted and described in connection with FIGS. 12-14 except switch circuitry 81 includes conductive switch elements 200 and 202. Switch elements 200 and 202 are located generally in or near respective positions 96 and 116 such that as mass member 30 moves into position 96 or 116 from position 50, mass member 30 contacts or otherwise engages respective switch element 200 or 202. In the illustrated embodiment, switch element 200 is fixedly coupled to contact 140, and switch element 202 is fixedly coupled to contact 146.

In the embodiment illustrated in FIG. 20, switch element 200 includes contiguous switch element segments 210, 212, 214, and 216 where segment 210 is fixedly coupled to contact 140. Switch element 200 comprises a flexible switch element 200 such that one or more of segments 210, 212, 214, and 216 are movable in angular relationship relative to each other, and segment 210 may bend/rotate relative to and/or with contact 140. Similarly, switch element 202 includes contiguous switch element segments 220, 222, 224, and 226 where segment 220 is fixedly coupled to contact 146. Switch element 202 also comprises a flexible switch element 202 such that one or more of segments 220, 222, 224, and 226 are movable in angular relationship relative to each other, and segment 220 may bend/rotate relative to and/or with contact 146. In the illustrated embodiment, switch elements 200 and 202 include non-linear switch element segments 210, 212, 214, 216, 220, 222, 224, and 226, respectively. For example, in the illustrated embodiment, switch elements 200 and 202 are formed having a generally modified Z-shaped configuration (e.g., when viewed from a position orthogonal to a plane of movement of switch elements 200 and 202); however, it should be understood that elements 200 and 202 may be otherwise configured.

In the illustrated embodiment, segment 210 extends from contact 140 toward mass member 30 and transitions to segment 212 such that segment 212 is in a direction substantially perpendicular to a direction of movement of mass member 30 (i.e., in an initial state/position). Segment 212 transitions to segment 214 such that segments 214 and 216 form an acute angle relative to each other (e.g., an open-sided acute triangle) in a spring-like configuration such that segment 216 extends in a direction toward mass member 30 at an acute angle relative to segment 214 (e.g., with the open-side of the acute triangle facing mass member 30). Segments 214 and 216 form a compressible spring at a distal end of switch element 200. In the embodiment illustrated in FIG. 20, switch element 202 (and segments 220, 222, 224, and 226) are configured similarly to as that described in connection with switch element 200.

In the illustrated embodiment, switch elements 200 and 202 have a Z-shaped configuration with a profile or maximum width less than that depicted in FIGS. 12-14 (e.g., relative to switch elements 130 and 132). In FIG. 20, circuitry 81 is initially in an open circuit state when mass member 30 is in the non-activated or initial pre-detection state/position 50 (i.e., prior to being subjected to an acceleration event). For example, in this embodiment, in the non-activated or initial pre-detection state/position 50 of mass member 30, segments 216 and 226 are each spaced apart from and/or in disengagement with respective contacts 142 and 144. Thus, if RFID module 84 is activated or energized by RFID reader 100 while mass member 30 is in the non-activated or initial pre-detection state 50 (i.e., prior to being subjected to an acceleration event), RFID module 84 would detect the open circuit condition of circuitry 81 and output or transmit value 92. Responsive to indicator 10 being subjected to an impact or acceleration event of a magnitude sufficient to cause movement of mass member 30 from the initial non-activated position 50 to an activated position (e.g., position 96 or 116), the state of circuitry 81 would change from being in an open circuit condition to a closed circuit condition because the movement of mass member 30 would result in mass member 30 contacting a respective switch element 200 or 202 and cause the respective switch element 200 or 202 to come in contact with and/or engage respective contact 142 or 144, thereby closing a respective circuit. Thus, responsive to movement of mass member 30 from the initial non-activated position 50 to an activated position 96 or 116, if RFID module 84 is activated or energized by RFID reader 100, RFID module 84 would detect the closed circuit condition of circuitry 81 and output or transmit value 94 instead of value 92. Thus, a change in the switch circuitry 81 state causes a change in a value output by RFID module 84 when activated.

As described above in connection with FIGS. 12-14, each switch element 200 and 202 may be part of and/or otherwise form a different, separate circuit (circuit 162 and 164, respectively) such that RFID module 84 can detect whether either circuit 162 or 164 is in an open or closed circuit condition. Similar to as described and depicted in connection with FIGS. 15A and 15B, although mass member 30 may disengaged from switch element 200 or 202 (i.e., mass member 30 is no longer contacting or applying a force to switch element 200 or 202), switch element 200 and/or 202 remains in engagement with respective contacts 142 and 144 such that circuit 162 and/or 164 remains in a closed circuit condition. In this embodiment, switch elements 200 and 202 comprise a flexible and/or deformable switch element 200 and 202 such that a force applied to switch element 200 and/or 202 by mass member 30 causes switch element 200 and/or 202 to compress within the space directly between contacts 144 and 146 (e.g., at least respective segments 214/216 and 224/226, thereby resulting in segments 214/216 and 224/226 being maintained in a compressed state against respective contacts 142 and 144. Being in a compressed state, switch elements 200 and 202 continues to apply a force to respective contacts 142 and 144, thereby maintaining circuit 162 or 164 in a closed circuit state after mass member 30 has moved away from position 96 or 116 (or away from contacting switch element 200 or 202). Thus, embodiments of the present invention provide an irreversible indication of impact activation by maintaining circuit 162 or 164 in a closed circuit state once circuit 162 or 164 has gone from an open circuit state to a closed circuit state. In the above description, circuits 162 and 164 are initially in an open circuit condition and then become a closed circuit in response to movement of mass member 30 against switch elements 200 or 202. However, it should be understood that the open/closed circuit condition or operation could be reversed (e.g., initially in a closed circuit condition where switch element 200 is in engagement with contact 142 where movement of mass member 30 against switch element 200 causes switch element 200 to disengage from contact 142). In this alternate embodiment, another contact or the configuration of switch element 200 may cause circuit 162 to remain in an open circuit state even after mass member 30 moves away from position 96.

Figure 21:
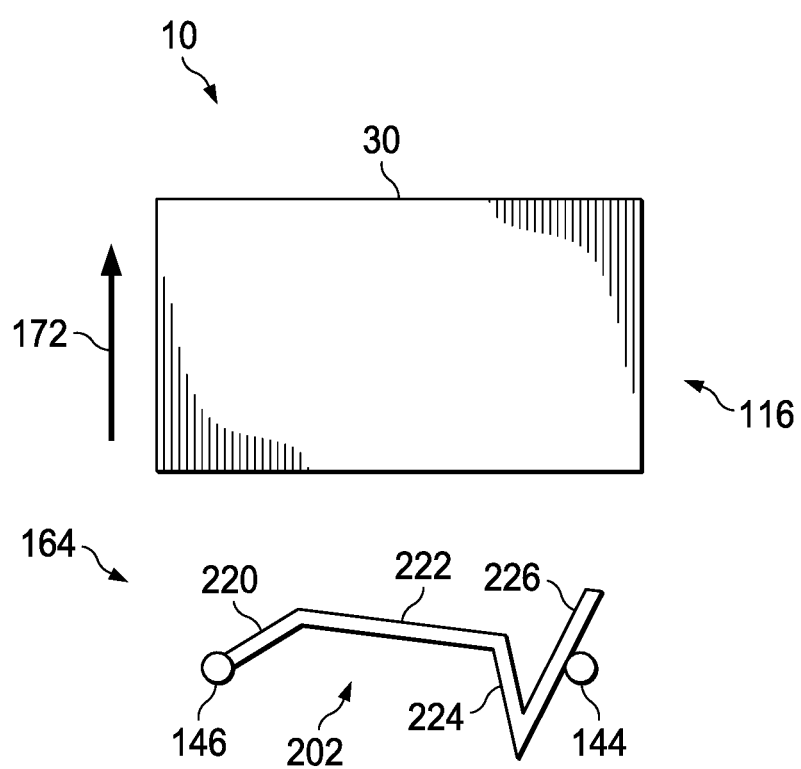
FIG. 21 is a diagram illustrating a portion of the impact indicator depicted in FIG. 20 according to an embodiment of the present disclosure.

FIG. 21 is a diagram illustrating a portion of impact indicator 10 depicted in FIG. 20 according to an embodiment of the present disclosure. In FIG. 21, only switch element 202 is depicted; however, it should be understood that the operation and/or function of switch element 200 is similar to that hereinafter described in connection with switch element 202. In FIG. 21, indicator 10 has been subjected to a first impact event such that mass member 30 has initially moved into position 116 such that the movement of mass member 30 towards position 116 has caused mass member 30 to contact switch element 202, thereby causing switch element segment 226 to engage contact 144 to place circuit 164 from an open circuit condition into a closed circuit condition. In FIG. 21, in response to indicator 10 being subjected to another impact event causing mass member 30 to move in direction 172 away from position 116, although mass member 30 has disengaged from switch element 202 (i.e., mass member 30 is no longer contacting or applying a force to switch element 202), switch element 202 remains in engagement with contact 144 such that circuit 164 remains in a closed circuit condition. In this embodiment, switch element 202 comprises a flexible and/or deformable switch element 202 such that a force applied to switch element 202 by mass member 30 causes switch element 202 to compress and/or deflect within the space directly between contacts 144 and 146, thereby resulting in switch element 202 being maintained in a compressed state between contacts 144 and 146. Being in a compressed state, switch element 202 continues to apply a force to contact 144, thereby maintaining circuit 164 in a closed circuit state after mass member 30 has moved away from position 116 (or away from contacting switch element 202). For example, segments 224 and 226 form a compressed leaf spring biased against contact 144 to maintain switch element 202 in engagement with contact 144. Thus, embodiments of the present invention provide an irreversible indication of impact activation by maintaining circuit 164 in a closed circuit state once circuit 164 has gone from an open circuit state to a closed circuit state. In the above description, circuit 164 is initially in an open circuit condition and then becomes a closed circuit in response to movement of mass member 30 against switch element 202. However, it should be understood that the open/closed circuit condition or operation could be reversed (e.g., initially in a closed circuit condition where switch element 202 is in engagement with contact 144 where movement of mass member 30 against switch element 202 causes switch element 202 to disengage from contact 144). In this alternate embodiment, another contact or the configuration of switch element 202 may cause circuit 164 to remain in an open circuit state even after mass member 30 moves away from position 116.

Figure 22:
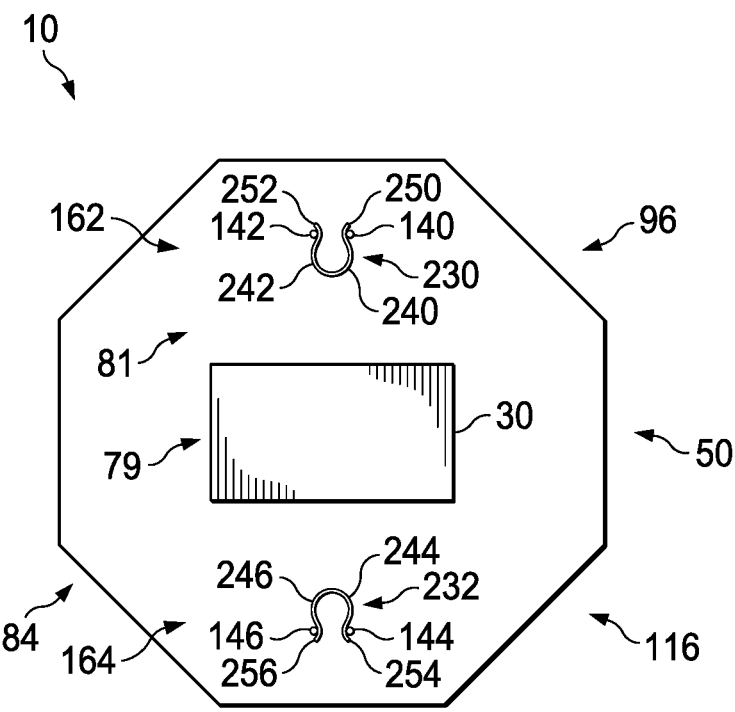
FIG. 22 is a diagram illustrating another embodiment of an impact indicator in accordance with the present disclosure.

FIG. 22 is a diagram illustrating another embodiment of impact indicator 10 in accordance with the present disclosure. In FIG. 22, most elements of indicator 10 (e.g., those depicted and described in connection with FIGS. 1-7) have been omitted for clarity and ease of description; however, it should be understood that indicator 10 may be similarly configured as depicted and described in connection with FIGS. 1-7. In the embodiment illustrated in FIG. 21, another embodiment of switching mechanism 79, circuitry 81, and RFID module 84 coupled to switch circuitry 81 are depicted. In the illustrated embodiment, switching mechanism 79 is formed by mass member 30 (e.g., without conductive element 121 (FIGS. 9-11)). Impact indicator 10 of FIG. 22 is configured similar to as that depicted and described in connection with FIGS. 12-14 except switch circuitry 81 includes conductive switch elements 230 and 232. Switch elements 230 and 232 are located generally in or near respective positions 96 and 116 such that as mass member 30 moves into position 96 or 116 from position 50, mass member 30 contacts or otherwise engages respective switch element 230 or 232. In the illustrated embodiment, switch element 230 is coupled to contacts 140 and 142, and switch element 232 is coupled to contacts 144 and 146.

In the embodiment illustrated in FIG. 22, switch elements 230 and 232 are formed as omega-shaped switch elements 230 and 232 (e.g., formed generally in the shape of the Greek letter "Ω"). Switch elements 230 and 232 comprises flexible switch elements 230 and 232 such that legs 240, 242, 244, and 246 of respective switch elements 230 and 232 are movable relative to each other to enable legs 240, 242, 244, and 246 of respective switch elements 230 and 232 to be biased inwardly toward each other, respectively, to position respective switch elements 230 and 232 between respective contacts 140, 142, 144, and 146. Thus, for example, referring to switch element 230, legs 240 and 242 may be biased inwardly toward each other to position legs 240 and 242 between and in engagement with respective contacts 140 and 142 (switch element 232 may be similarly positioned between and in engagement with contacts 144 and 146).

Figure 23:
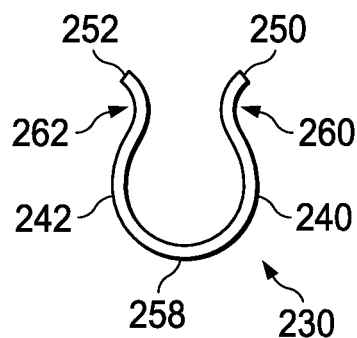
FIG. 23 is a diagram illustrating an enlarged view of a switch element of the impact indictor depicted in FIG. 22 in accordance with the present disclosure.

In the illustrated embodiment, switch elements 230 and 232 each have outwardly projecting bases 250, 252, 254, and 256 extending from respective legs 240, 242, 244, and 246. For example, referring to FIG. 23, an enlarged view of switch element 230 is depicted in accordance with the present disclosure. It should be understood that switch element 232 may be similarly configured. As depicted in FIG. 23, leg 240 arcs or curves outwardly from a top 258 thereof and then inwardly as leg 240 reaches base 250. Thus, the intersection or meeting of leg 240 with base 250 forms an inwardly directed joint or seating area 260 for receiving contact 140 therein (FIG. 22). Similarly, leg 242 arcs or curves outwardly from top 258 and then inwardly as leg 242 reaches base 252, and the intersection or meeting of leg 242 with base 252 forms an inwardly directed joint or seating area 262 for receiving contact 142 therein (FIG. 22).

Thus, in operation, legs 240 and 242 may be compressed or biased inwardly toward each other to enable the positioning of contacts 140 and 142 within respective seating areas 260 and 262. Once switch element 230 is positioned between contacts 140 and 142 with contacts 140 and 142 within respective seating areas 260 and 262, legs 240 and 242 apply an outwardly directed biasing force to maintain switch element 230 between and in engagement with respective contacts 140 and 142. It should be understood that switch element 232 may be similarly positioned relative to contacts 144 and 146.

In FIG. 22, circuitry 81 is initially in a closed circuit state when mass member 30 is in the non-activated or initial pre-detection state/position 50 (i.e., prior to being subjected to an acceleration event). For example, in this embodiment, in the non-activated or initial pre-detection state/position 50 of mass member 30, switch elements 230 and 232 are in engagement with respective contacts 140, 142, 144, and 146. Thus, if RFID module 84 is activated or energized by RFID reader 100 while mass member 30 is in the non-activated or initial pre-detection state 50 (i.e., prior to being subjected to an acceleration event), RFID module 84 would detect the closed circuit condition of circuitry 81 and output or transmit value 94. Responsive to indicator 10 being subjected to an impact or acceleration event of a magnitude sufficient to cause movement of mass member 30 from the initial non-activated position 50 to an activated position (e.g., position 96 or 116), the state of circuitry 81 would change from being in a closed circuit condition to an open circuit condition because the movement of mass member 30 would result in mass member 30 contacting a respective switch element 230 or 232 and cause the respective switch element 230 or 232 to disengage respective contacts 140, 142, 144, or 146, thereby opening a respective circuit. Thus, responsive to movement of mass member 30 from the initial non-activated position 50 to an activated position 96 or 116, if RFID module 84 is activated or energized by RFID reader 100, RFID module 84 would detect the open circuit condition of circuitry 81 and output or transmit value 92 instead of value 94. Thus, a change in the switch circuitry 81 state causes a change in a value output by RFID module 84 when activated.

As described above in connection with FIGS. 12-14, each switch element 230 and 232 may be part of and/or otherwise form a different, separate circuit (circuit 162 and 164, respectively) such that RFID module 84 can detect whether either circuit 162 or 164 is in an open or closed circuit condition.

Figure 24:
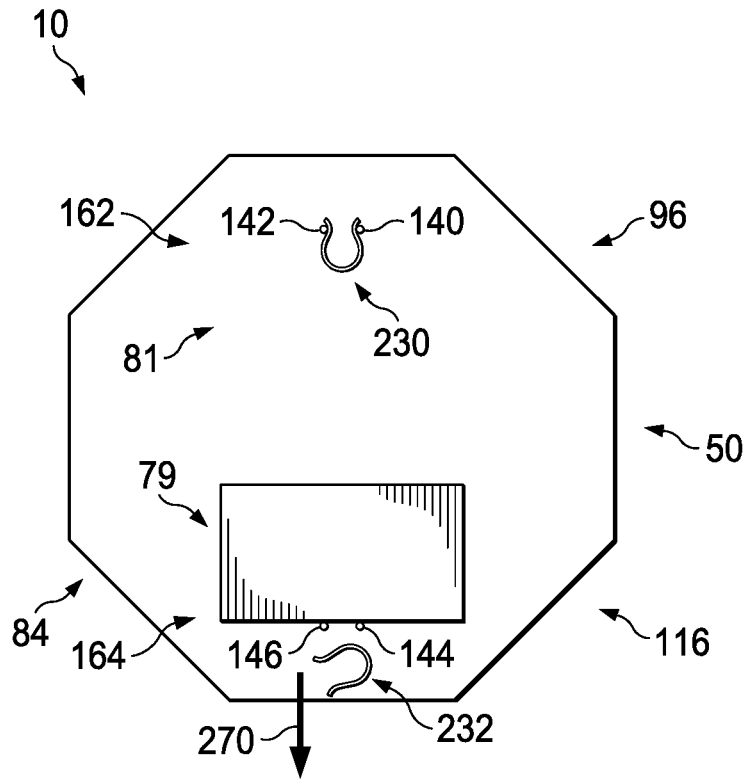
FIG. 24 is a diagram illustrating the embodiment of the impact indictor depicted in FIG. 22 after receipt of a shock event in accordance with the present disclosure.

FIG. 24 is a diagram illustrating impact indicator 10 depicted in FIG. 22 according to an embodiment of the present disclosure after receipt of an acceleration or impact event in accordance with the present disclosure. In FIG. 24, indicator 10 has been subjected to a first impact event such that mass member 30 has initially moved into position 116 such that the movement of mass member 30 towards position 116 has caused mass member 30 to contact switch element 232, thereby causing switch element 232 to disengage from contacts 144 and 146 to place circuit 164 from a closed circuit condition into an open circuit condition. For example, in operation, mass member 30 moves from position 50 to position 116 in response to an acceleration or impact event, thereby causing contact between mass member 30 and switch element 232. The force of mass member 30 contacting switch element 232 results in the biasing force of legs 244 and 246 against contacts 144 and 146 to be overcome, thereby causing switch element 232 to move in a direction indicated by 270 and disengage from contacts 144 and 146. Once switch element 232 is disengaged from contacts 144 and 146, switch element 232 remains in disengagement with contacts 144 and 146 such that circuit 164 remains in an open circuit condition. Thus, embodiments of the present invention provide an irreversible indication of impact activation by maintaining circuit 164 in an open circuit state once circuit 164 has gone from a closed circuit state to an open circuit state. It should be understood that movement of mass member into position 96 would similarly cause switch element 230 to disengage from contacts 140 and 142, thereby causing circuit 162 to transition from a closed circuit state to an open circuit state.

Thus, embodiments of the present disclosure enable impact and/or acceleration event detection using an impact indicator having a small footprint using a mechanical shock monitoring device with a passive RFID tag that gives a different reading depending upon the status of the impact switch circuitry. Because the RFID tag is passive, the impact indicator does not need a battery or other external power source. Further, the configuration of the impact indictor enables the impact indicator to be irreversible once activated (or subjected to a sufficient magnitude of impact event). Additionally, the impact indicator of the present disclosure may be configured with a single or multiple indication mechanisms (e.g., with window 22 where indicator 10 provides a visual indication of activation, with a combination of window 22 and with an RFID transmitted value indicating the activation status, or with an RFID transmitted value without window 22).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An impact indicator, comprising:
a housing;
switch circuitry having an omega-shaped switch element; and
a mass member movable within the housing from a first position to a second position in response to receipt by the housing of an acceleration event, wherein movement of the mass member to the second position causes the mass member to move the switch element to change a state of a circuit condition of the switch circuitry, the change of the state of the switch circuitry indicating receipt of the acceleration event.

2. The impact indicator of claim 1, wherein the switch element is a flexible switch element.

3. The impact indicator of claim 1, wherein the switch circuitry includes a plurality of spaced apart contacts.

4. The impact indicator of claim 1, wherein:
the switch circuitry includes a plurality of spaced apart contacts; and
the switch element is movably positioned between the contacts.

5. The impact indicator of claim 1, wherein:
the switch circuitry includes a plurality of spaced apart contacts; and
the switch element is retained between the contacts by a biasing force applied by the switch element to the contacts.

6. The impact indicator of claim 1, wherein the switch circuitry includes a plurality of spaced apart contacts, and wherein the switch element includes a plurality of seating areas each configured to receive a respective contact in engagement therewith.

7. The impact indicator of claim 1, wherein the switch member is configured to be compressed between a plurality of conductive contacts.

8. An impact indicator, comprising:
a housing;
switch circuitry having an omega-shaped switch element coupled to a plurality of spaced apart conductive contacts; and
a mass member movable within the housing in response to receipt by the housing of an acceleration event, wherein movement of the mass member causes the switch element to disengage from the contacts to change a state of a circuit condition of the switch circuitry, the change in the state of the switch circuitry indicating receipt of the acceleration event.

9. The impact indicator of claim 8, wherein the switch element is a flexible switch element.

10. The impact indicator of claim 8, wherein the switch element is retained between the contacts by a biasing force applied by the switch element to the contacts.

11. The impact indicator of claim 8, wherein:
the switch element is retained between the contacts by a biasing force applied by the switch element to the contacts; and
movement of the mass member causes the mass member to overcome the biasing force to disengage the switch element from the contacts.

12. The impact indicator of claim 8, wherein the disengagement of the switch element from the contacts causes the switch circuitry to change from a closed circuit condition to an open circuit condition.

13. An impact indicator, comprising:
a housing;
switch circuitry having an omega-shaped switch element and a plurality of spaced apart conductive contacts, wherein each leg of the switch element is coupled to a respective contact; and
a mass member movable within the housing in response to receipt by the housing of an acceleration event, wherein movement of the mass member causes the switch element to disengage from the contacts to change a state of a circuit condition of the switch circuitry, the change in the state of the switch circuitry indicating receipt of the acceleration event.

14. The impact indicator of claim 13, wherein the switch element is a flexible switch element.

15. The impact indicator of claim 13, wherein the switch element is retained between the contacts by a biasing force applied by each leg of the switch element to a respective contact.

16. The impact indicator of claim 13, wherein:
the switch element is retained between the contacts by a biasing force applied by each leg of the switch element to a respective contact; and
movement of the mass member causes the mass member to apply a force to the switch element to overcome the biasing force to disengage the switch element from the contacts.

17. The impact indicator of claim 13, wherein the switch element includes a plurality of seating areas each configured to receive a respective contact in engagement therewith.

18. The impact indicator of claim 13, wherein the switch element is a compressible switch element.

19. The impact indicator of claim 13, wherein the disengagement of the switch element from the contacts causes the switch circuitry to change from a closed circuit condition to an open circuit condition.

20. The impact indicator of claim 13, wherein the impact indicator is configured to transmit a first value for an open circuit condition of the switch circuitry and a second value different from the first value for a closed circuit condition of the switch circuitry.

* * * * *